May 3, 1966 H. A. McMASTER ETAL 3,249,415
APPARATUS FOR HEAT TREATING GLASS SHEETS
Original Filed Oct. 13, 1960 12 Sheets-Sheet 8
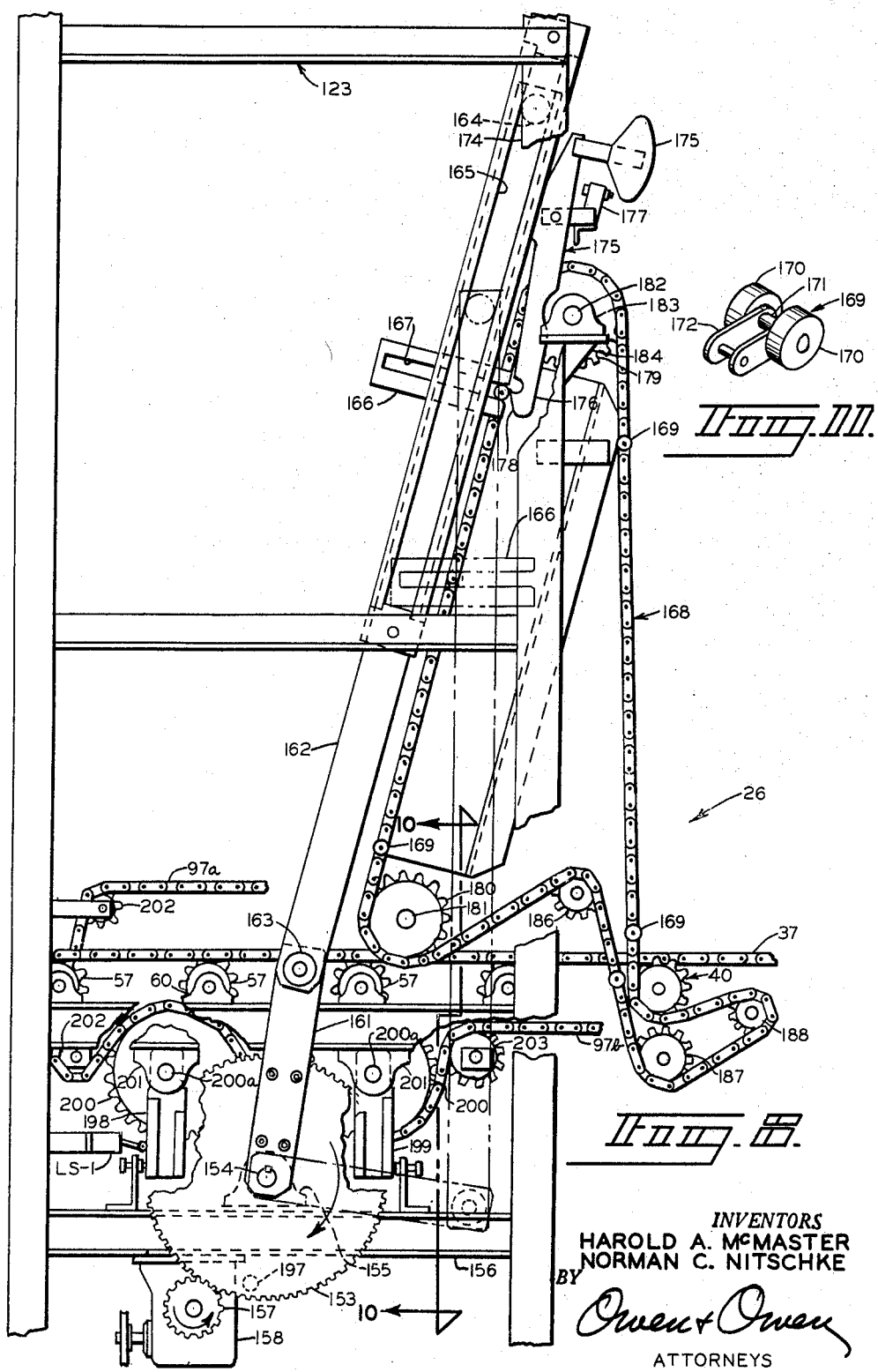
INVENTORS
HAROLD A. McMASTER
NORMAN C. NITSCHKE
BY Owen & Owen
ATTORNEYS

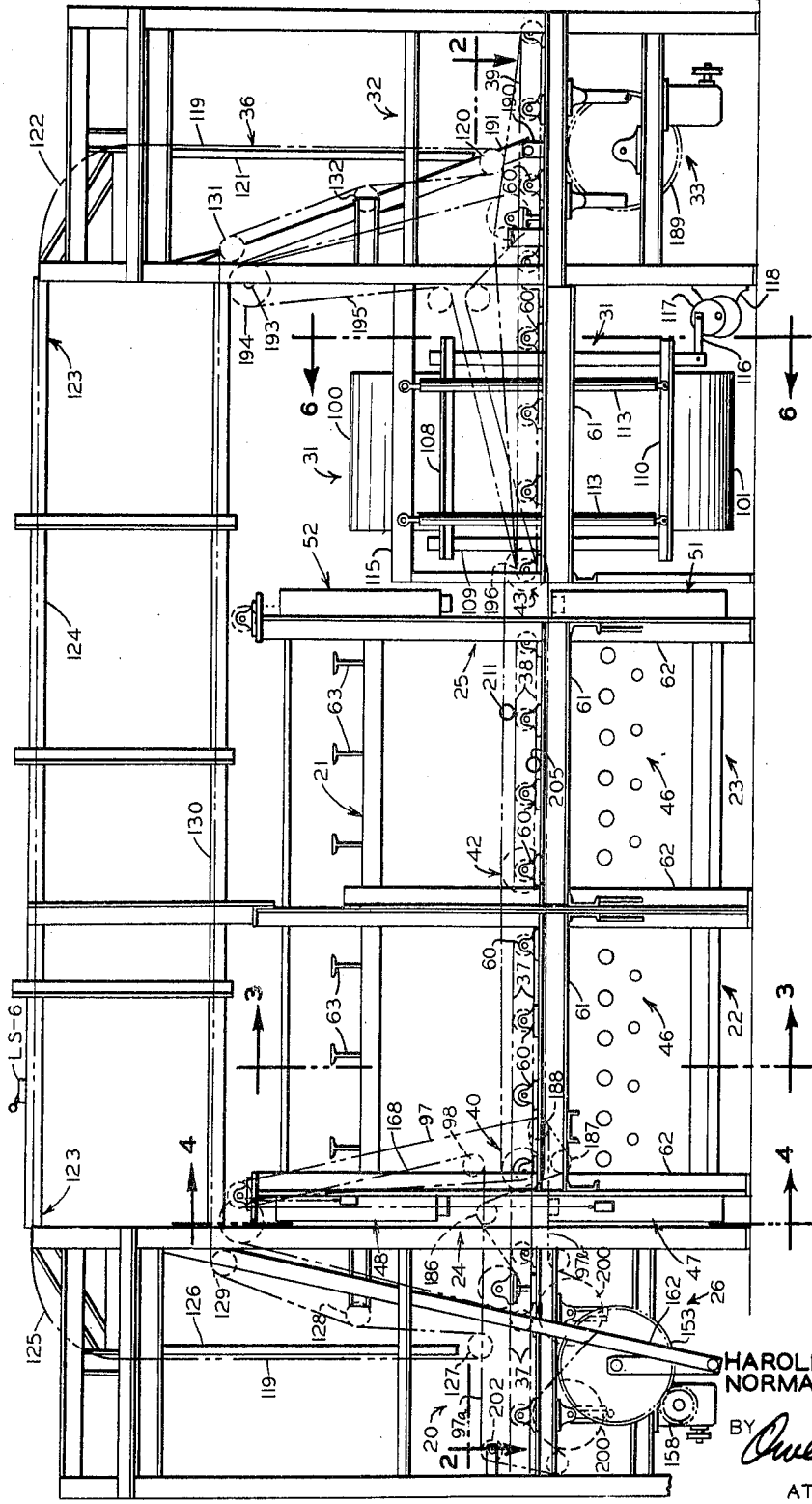

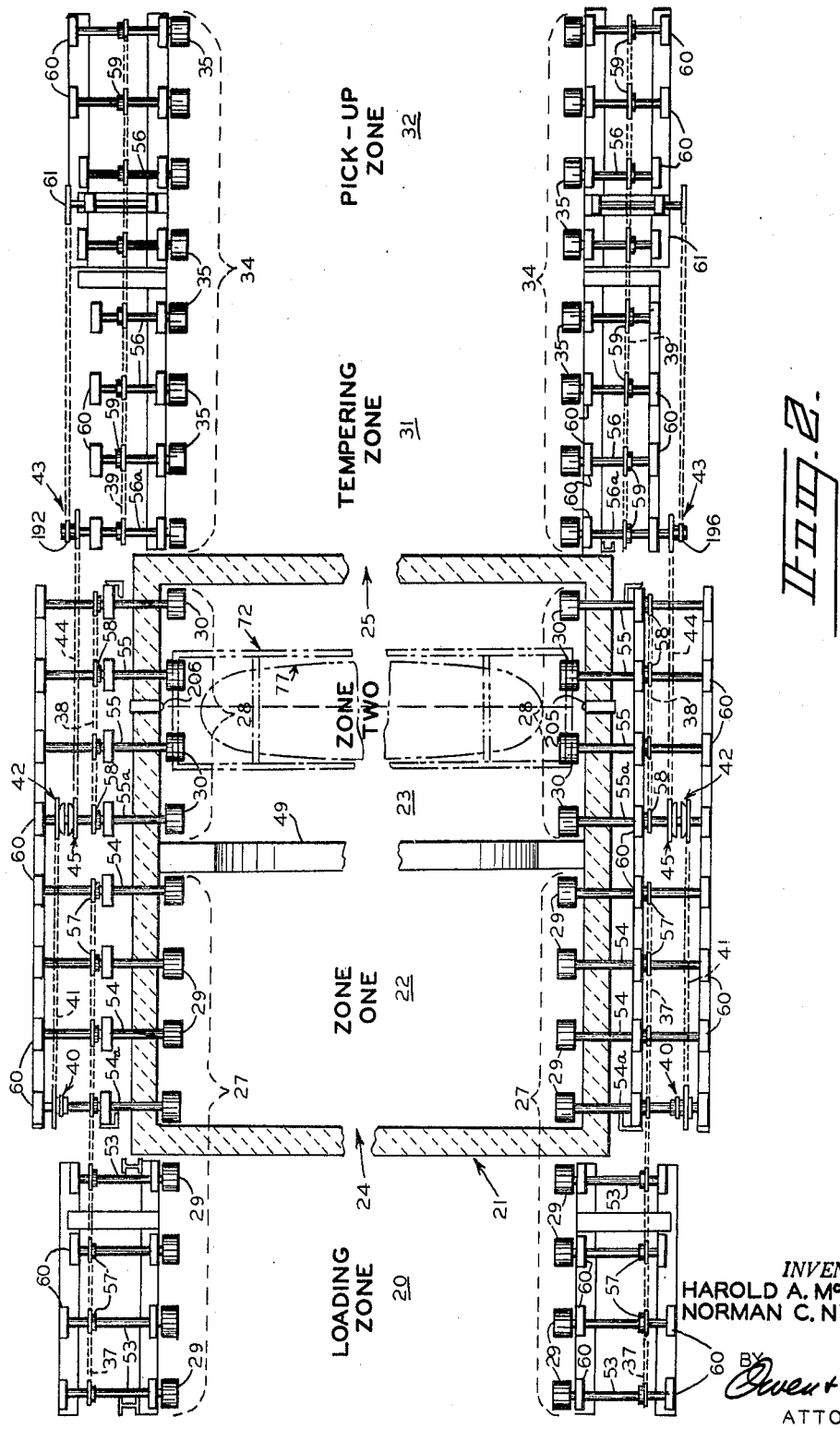

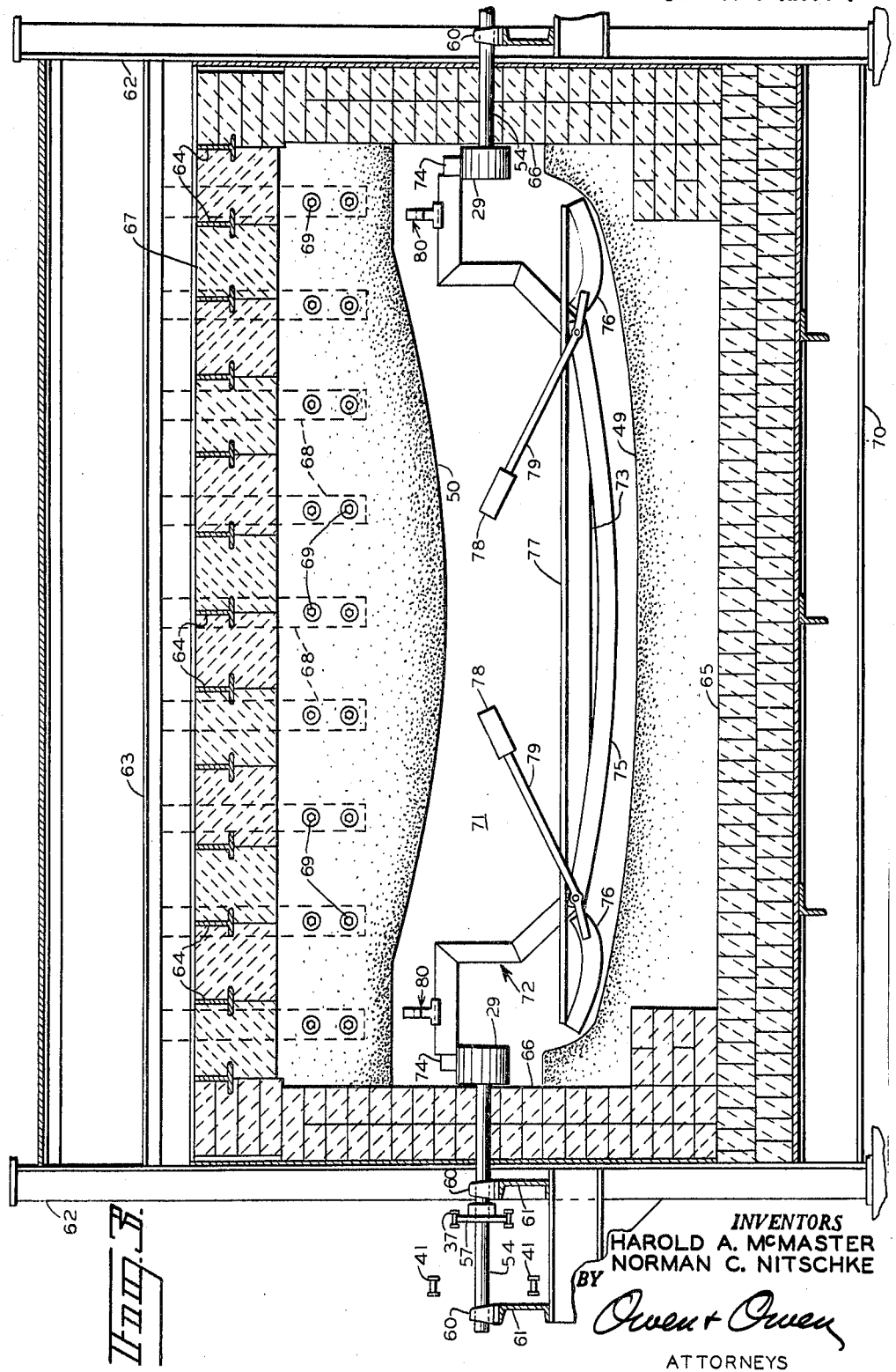

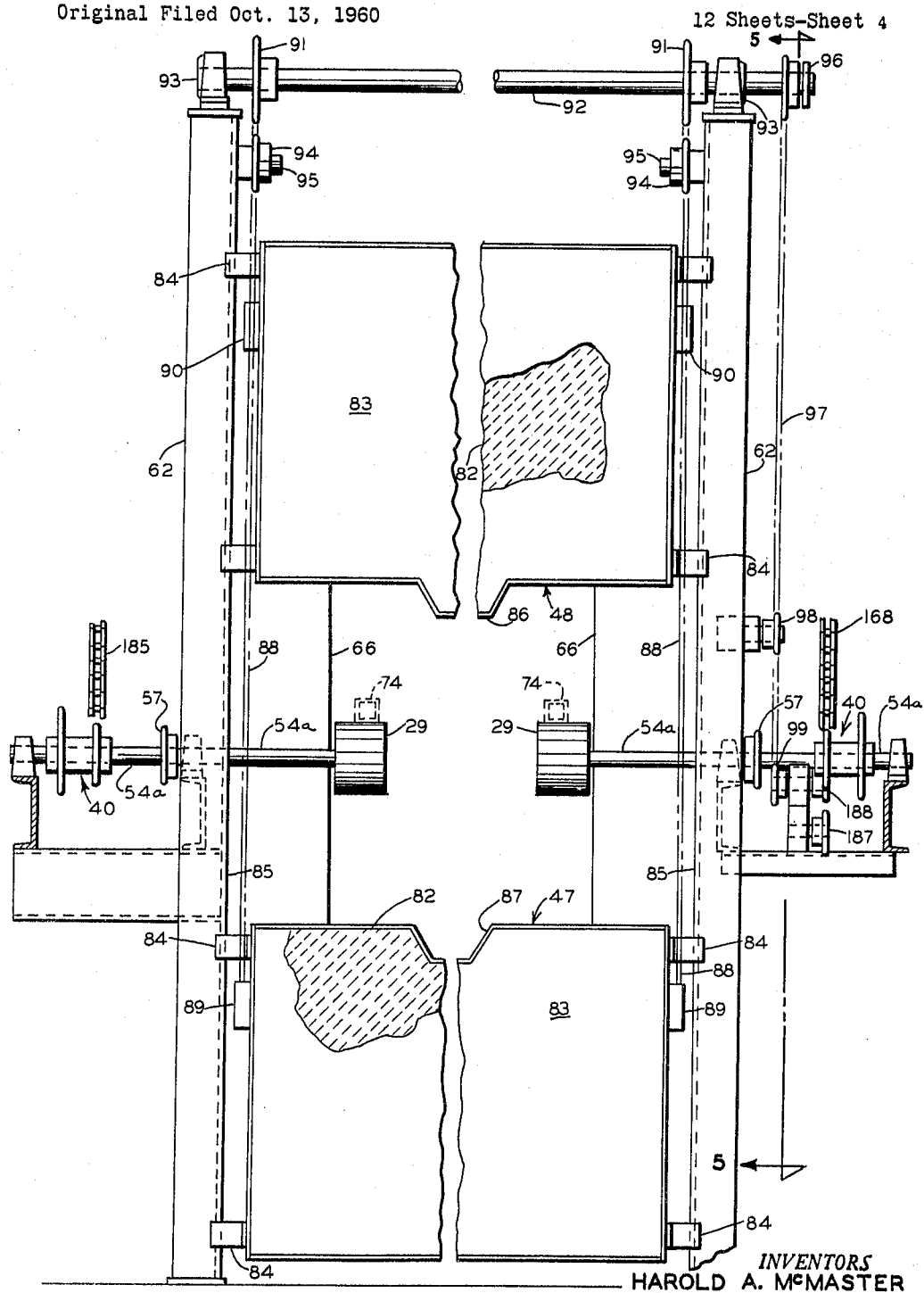

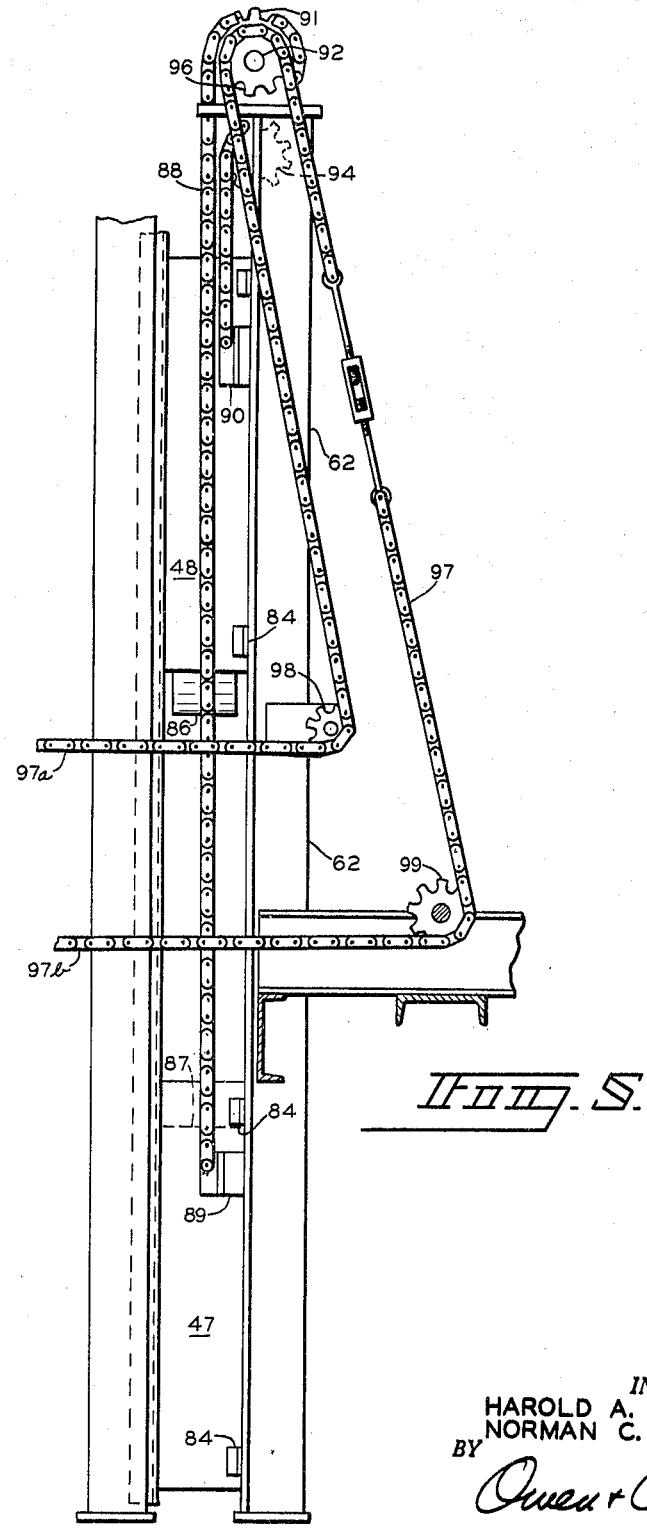

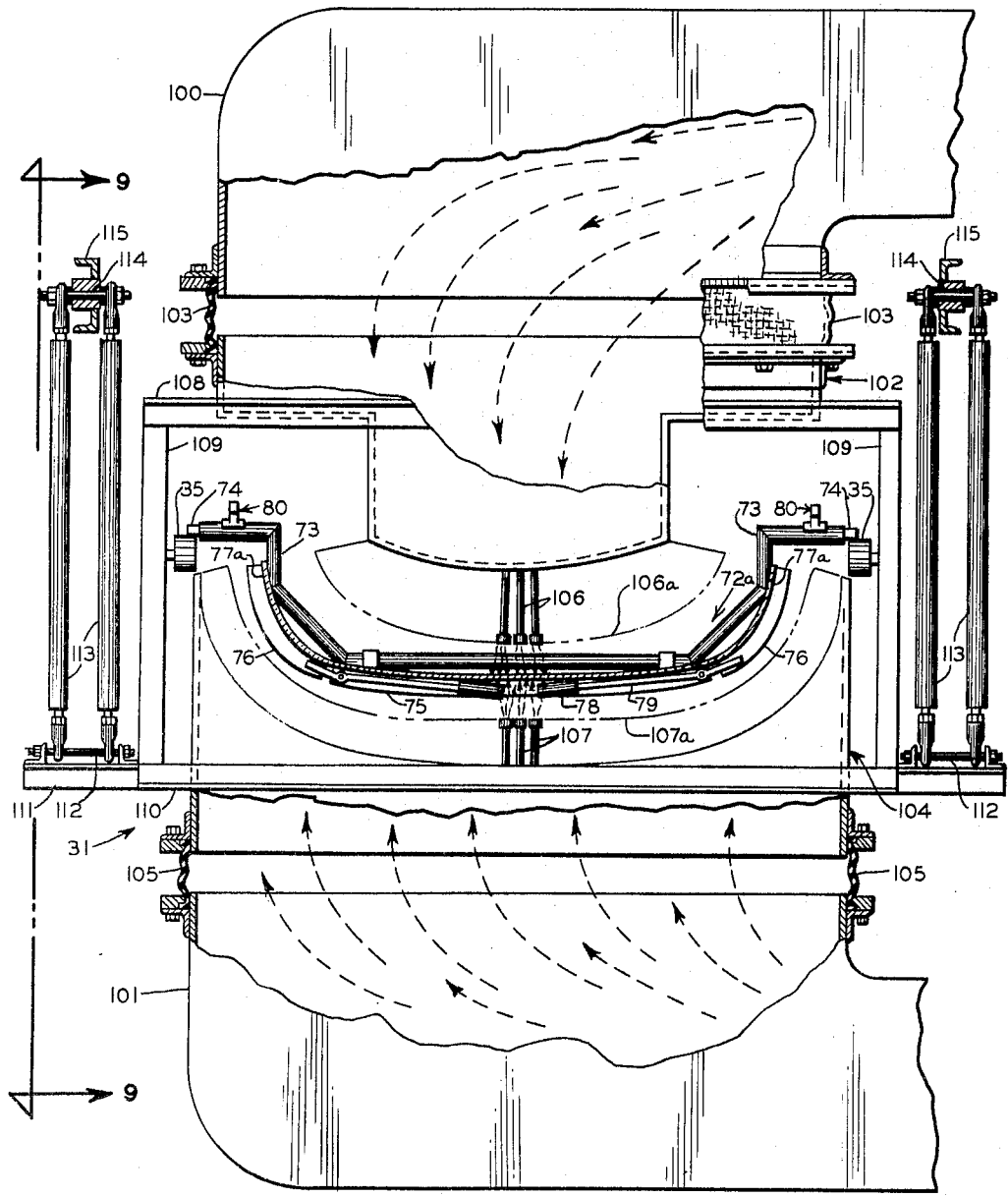

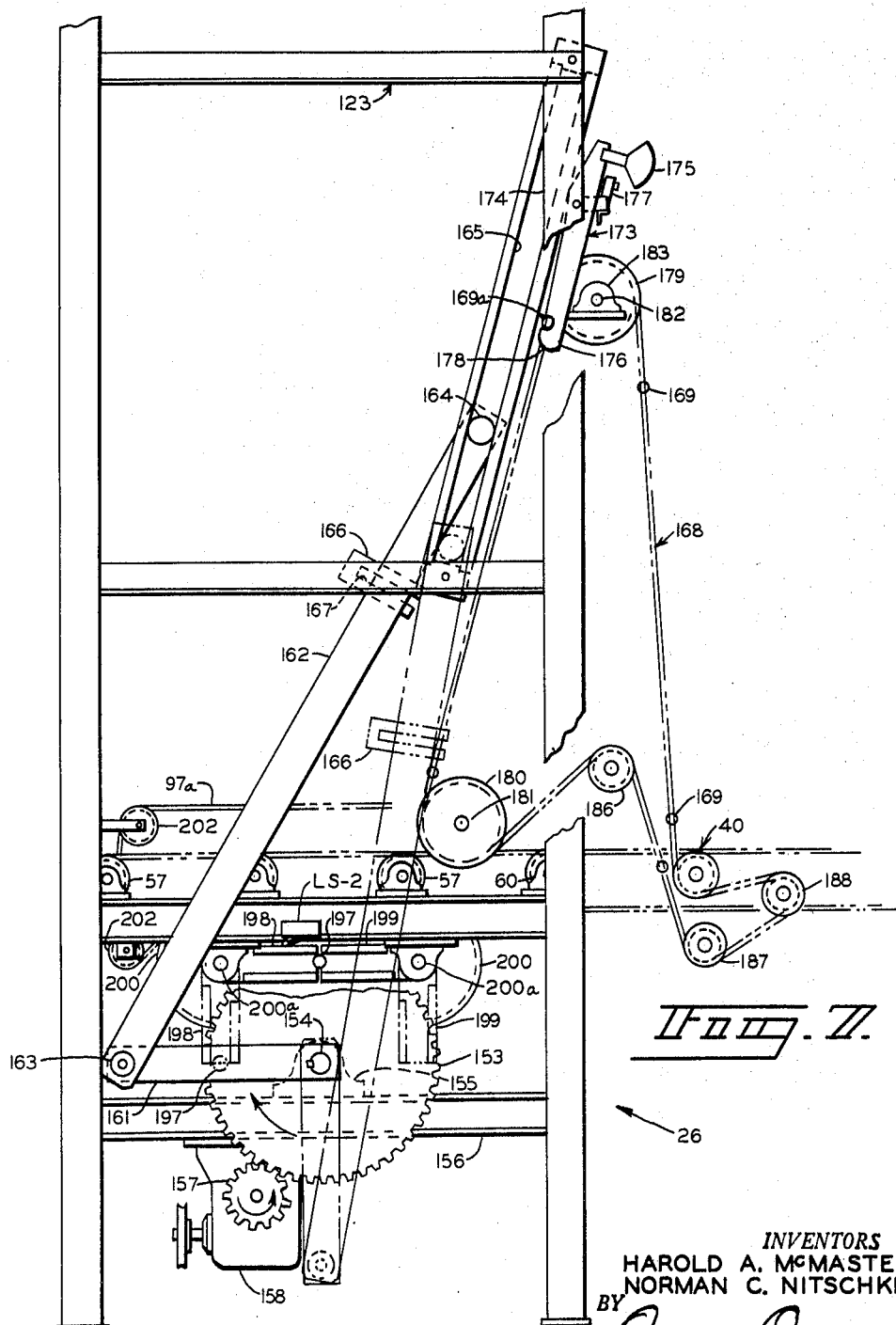

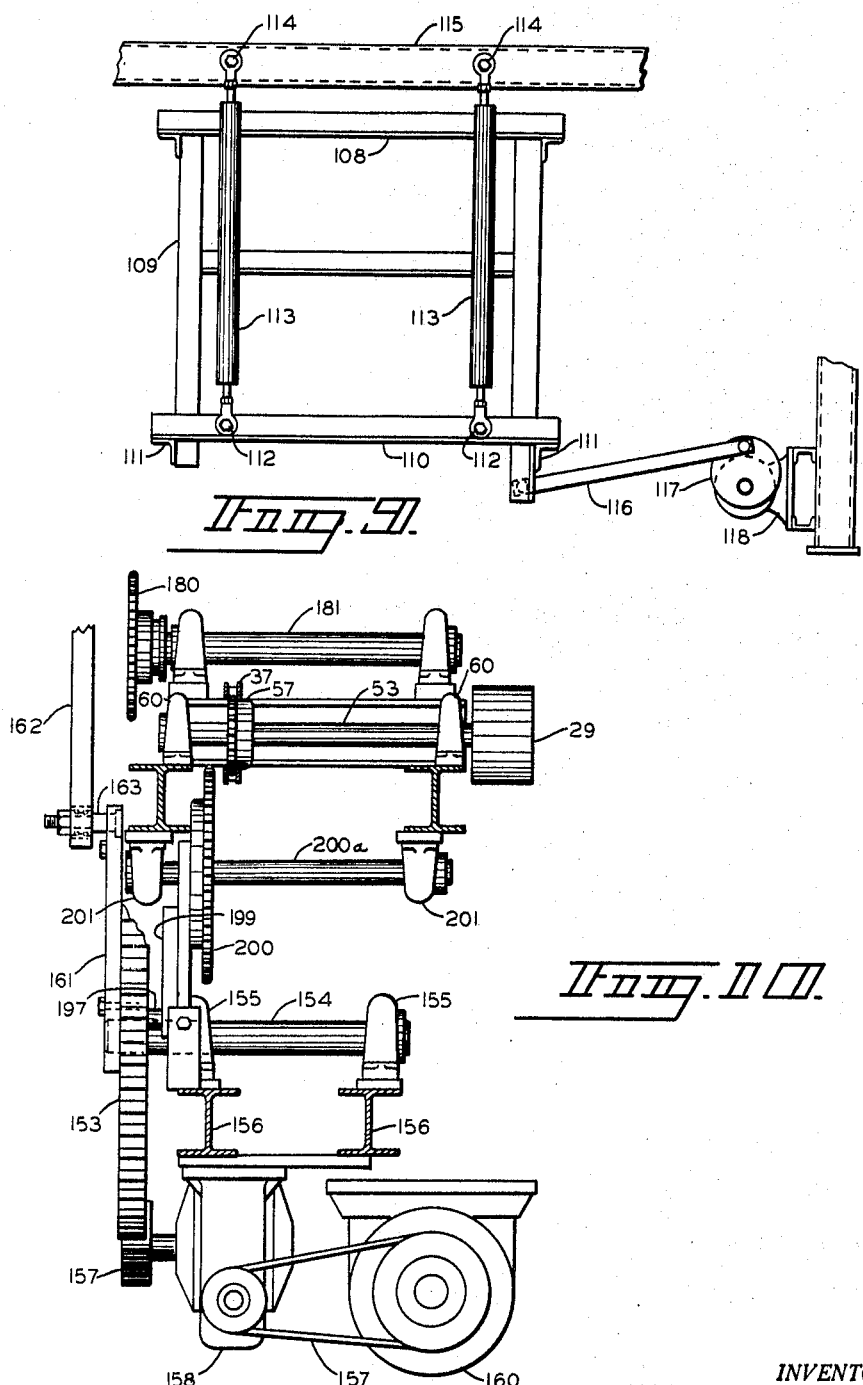

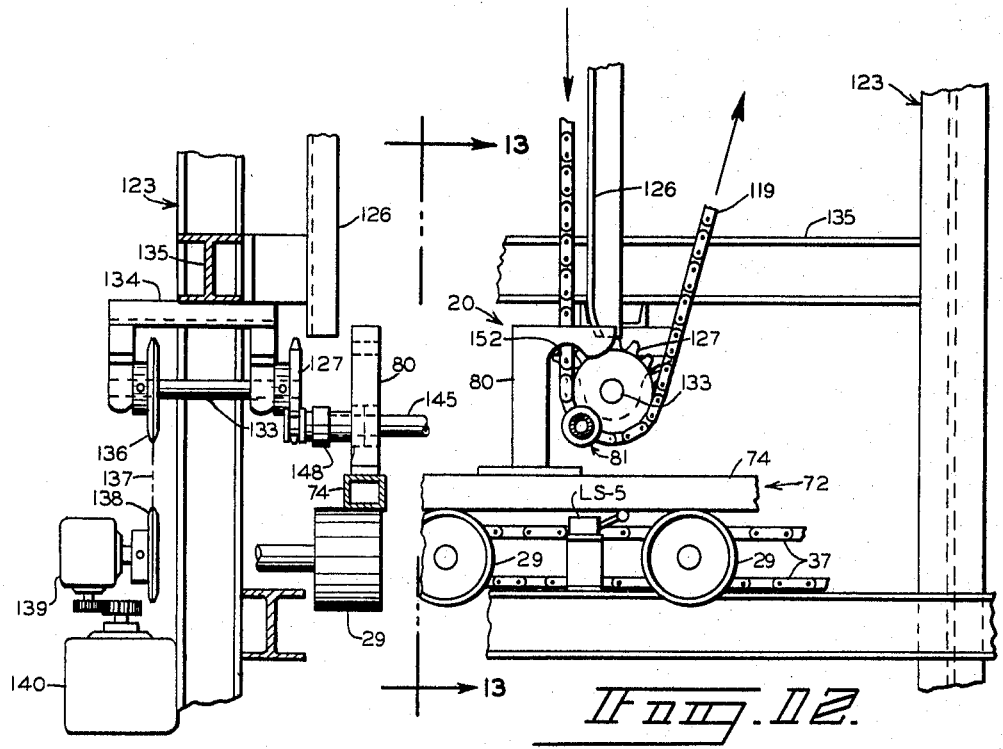
Fig. 12.
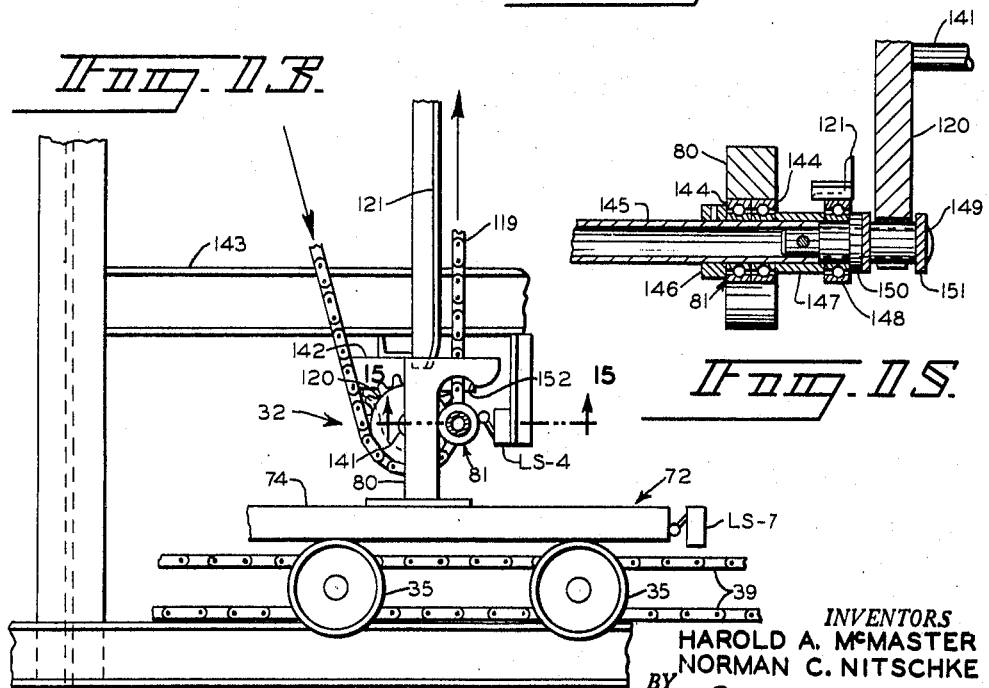
Fig. 13.
Fig. 14.
Fig. 15.
INVENTORS
HAROLD A. McMASTER
NORMAN C. NITSCHKE
BY Owen + Owen
ATTORNEYS May 3, 1966    H. A. McMASTER ETAL    3,249,415
APPARATUS FOR HEAT TREATING GLASS SHEETS
Original Filed Oct. 13, 1960    12 Sheets-Sheet 12
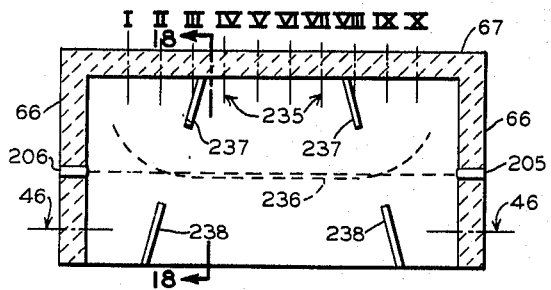
Fig. 17.
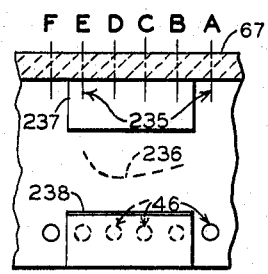
Fig. 18.
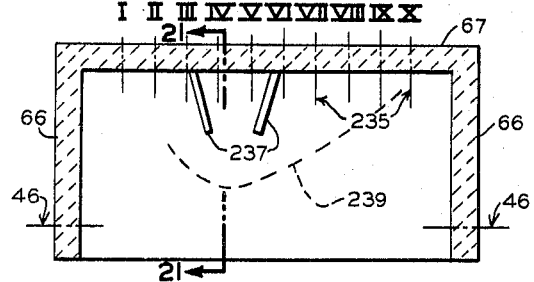
Fig. 20.
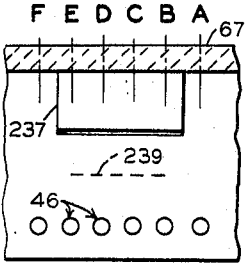
Fig. 21.
Fig. 19.
Fig. 22.
LEGEND
⊗ BURNER ON – NORMAL PRESSURE
Ⓗ BURNER ON – HIGH PRESSURE
Ⓤ BURNER ON – ULTRA HIGH PRESSURE
INVENTORS.
HAROLD A. McMASTER
NORMAN C. NITSCHKE
BY Owen + Owen
ATTORNEYS

United States Patent Office 3,249,415
Patented May 3, 1966

3,249,415
APPARATUS FOR HEAT TREATING
GLASS SHEETS
Harold A. McMaster, Woodville, and Norman C. Nitschke, Perrysburg, Ohio, assignors to Permaglass, Inc., Woodville, Ohio, a corporation of Ohio
Continuation of application Ser. No. 62,463, Oct. 13, 1960. This application Dec. 24, 1964, Ser. No. 421,064
5 Claims. (Cl. 65—160)

This is a continuation of our co-opending application Serial No. 62,463 filed October 13, 1960, now abandoned.

This invention relates to apparatus for heat treating glass sheets and will be described and illustrated as embodied in an apparatus including a multi-zone furnace, a tempering or quenching zone, a conveyor for feeding the glass sheets to be treated on individual mold carriages through the apparatus, a conveyor for returning the carriages to an unloading and loading station and the necessary drive mechanisms and controls by which the furnace is operated.

In the high speed commercial production of bent and/or tempered glass sheets such as those used in the back lights of automobiles, in the windshields of boats and the windows of trailers, and for other purposes, rapidity of production of uniformly bent parts is the goal toward the accomplishment of which furnaces and allied mechanisms have been designed. The use of molds each of which supports and determines the final shape of a single piece of glass and which are moved sequentially through the furnace apparatus has been suggested. Many of the difficulties in operation with furnaces of the type employing such molds arise from the fact that there is a very great variation in the thickness of different pieces of glass even when received from the glass manufacturer in a single shipment. Such differences in thickness may amount to as much as 15 or 20 percent with the result that the reaction of two successive pieces of glass to the conditions encountered in the heating and bending portions of a furnace are substantially different. Thus, one piece of glass under the same treatment and for the same length of time as another piece of glass may fail to be sufficiently bent or it may bend to such degree as to sag and be useless for the purpose intended.

Because of the substantial size of the sheets of glass used for the above mentioned purposes and for similar purposes, an apparatus for their treatment becomes rather large and may occupy as much as 30 or 40, or even more, feet of space. Since the glass sheets must be individually loaded into the apparatus and removed from the apparatus after they are treated, it becomes difficult for a single operator to both load and unload the apparatus. To this end, it has been suggested that such an apparatus should be arranged in circular form so that the apparatus delivers a treated sheet of glass to the same general area as that in which an operator places the sheets of glass in the molds prior to treatment. However, by thus arranging an apparatus, it occupies a much greater area of the plant or factory in which it is located because the size of the sheets of glass prevents the curvature of the furnace from being made on a short radius. Such a circular apparatus may have a radius of more than 15 or 20 feet.

In co-pending application of Harold A. McMaster, Serial No. 21,225, and now abandoned and its continuation-in-part application Serial No. 414,294, filed November 27, 1964, it is taught that the control of the bending of a sheet of glass of the type herein discussed may be accomplished by the use of a photocell and light beam wherein the light beam is interrupted by the glass itself when it reaches the desired contour to actuate the control. The present invention contemplates the utilization of the system disclosed in this application as well as the utilization of a more conventional time control system, and provides an apparatus which can be controlled by either or a combination of both control systems. According to the invention, it is thus possible to divide the furnace into a plurality of zones each having a different temperature and to provide for the movement of the glass pieces under treatment from zone to zone under the control of a timing apparatus and for their movement out of the final zone in response to their reaching their final shape or temperature. Conversely, if desired, a furnace embodying the invention may be so set as to operate under a single system of control with glass pieces moving from station to station and zone to zone in unison.

It is, therefore, the principal object of the instant invention to provide an apparatus for treating glass which is compact in size, being reduced to the barest dimensions necessary for enclosing the glass sheets under treatment in the furnace which has a plurality of zones and each zone of which is but slightly larger than the sheet under treatment, and to provide for an automatic control whereby the glass sheets are fed through the furnace through such auxiliary treating equipment as desired, for example, a tempering station, and then automatically returned to the entrance end of the furnace so that the finished sheet may be removed from its mold by the operator who then places a new, untreated sheet on the same mold.

It is another object of the instant invention to provide a compact furnace for treating glass sheets having two heat treating zones arranged closely adjacent each other and in a straight line with the treating zones extending away from the loading position and with subsequent treating zones located at the far side of the furnace remote from the loading position, the dwell of the glass sheets in each of the zones and their return from the most remote portion of the furnace to the loading station all being automatically carried out by control and drive mechanisms according to the invention.

Yet another object of the invention resides in the construction of an apparatus for treating glass sheets including a furnace having a plurality of treating zones so arranged and constructed as to provide for the application of heat in varying degree to different portions of the glass being treated, thus to facilitate the bending of the glass in sharp radii at the places where such bends are desired without at the same time overheating other portions of the glass which are to be bent to a lesser degree or not bent at all; and providing for heating variations across the glass surface both longitudinally and transversely.

Yet a further object of the invention is to provide a control mechanism for an apparatus including a multi-zone furnace which provides for independent operation of conveyor means for moving the glass into the separate zones and also is readily changed so as to provide for a single control for moving the glass into and out of all of the zones and stations.

These and other more specific objects and advantages of an apparatus embodying the invention will be better understood from the specification which follows and from the drawings, in which:

FIG. 1 is a view in side elevation of an apparatus for bending and tempering glass sheets and embodying the invention;

FIG. 2 is a simplified horizontal, sectional view taken generally along the line 2—2 of FIG. 1, and showing the conveyor means whereby individual mold carriages are fed through an apparatus embodying the invention;

FIG. 3 is a vertical, sectional view taken along the line 3—3 of FIG. 1 and shown on an enlarged scale;

FIG. 4 is a fragmentary, vertical view mostly in elevation and with parts broken away and taken from the position indicated by the line 4—4 of FIG. 1;

FIG. 5 is a fragmentary view, partly in section, taken from the position indicated by the line 5—5 of FIG. 4;

FIG. 6 is a fragmentary view taken from the position indicated by the line 6—6 of FIG. 1 with parts broken away and shown on an enlarged scale;

FIG. 7 is a fragmentary, detailed view on an enlarged scale of the drive mechanism shown at the left side of FIG. 1 and FIG. 7 shows the drive mechanism at two positions in a cycle of operations, viz., 0° and 270°;

FIG. 8 is a view similar to FIG. 7 but showing the drive mechanism in two other positions, viz., 90° and 180°;

FIG. 9 is a fragmetary view in elevation taken from the position indicated by the line 9—9 of FIG. 6;

FIG. 10 is a fragmentary, detailed view showing parts of the drive mechanism illustrated in FIGS. 7 and 8 and taken from the position indicated by the line 10—10 of FIG. 8;

FIG. 11 is a deatiled view in perspective showing an operating dog employed on the drive mechanism illustrated in FIGS. 7 and 8;

FIG. 12 is a fragmentary view, partly in elevation, of parts of a return conveyor utilized in the apparatus of the invenittion;

FIG. 13 is a fragmentary view taken along the line 13—13 of FIG. 12;

FIG. 14 is a view similar to FIG. 12 but showing the end of the conveyor opposite to that shown in FIG. 12;

FIG. 15 is a fragmentary view on an enlarged scale taken along the line 15—15 of FIG. 14;

FIG. 17 is a diagrammatic transverse sectional view through a furnace operated according to the method of the invention for bending a glass sheet having two areas of sharp curvature;

FIG. 18 is a diagrammatic vertical sectional view taken along the line 18—18 of FIG. 17;

FIG. 19 is a burner hook-up chart for the operation illustrated in FIGS. 17 and 18;

FIG. 20 is a view similar to FIG. 17 but showing operation according to the invention for bending a glass sheet having only one area of sharp curvature;

FIG. 21 is a view similar to FIG. 18 but taken along the line 21—21 of FIG. 20;

FIG. 22 is a burner hook-up chart for the operation illustrated in FIGS. 20 and 21.

General description

Figure 16:
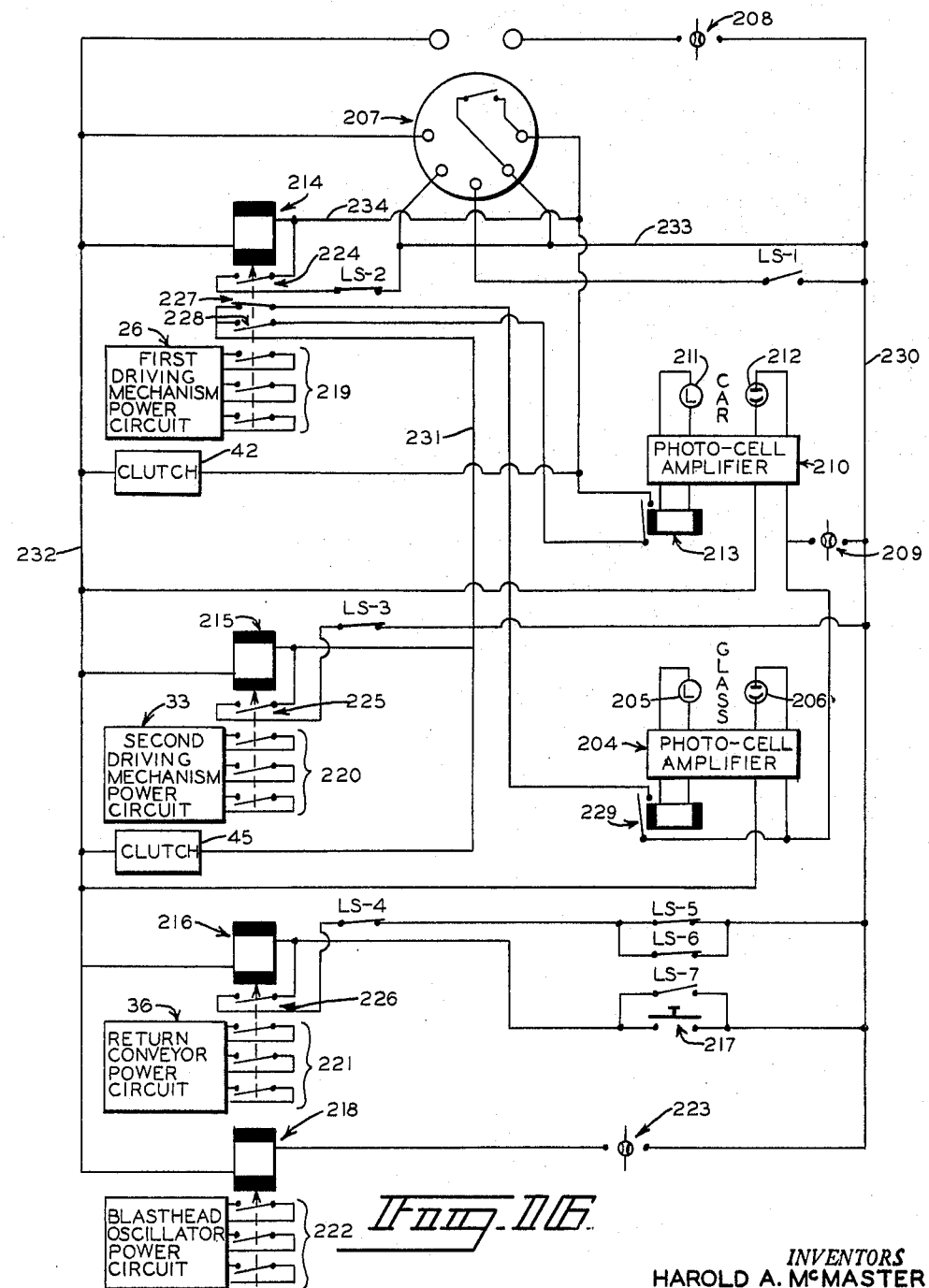
FIG. 16 is a schematic wiring diagram for the operation and control of apparatus embodying the invention.

An apparatus for treating glass according to the invention is generally divided into several major stations and zones and into several major operative apparatuses. Referring preliminarily to FIGS. 1 and 2, at the left end of the apparatus there is located a loading zone or first station, generally indicated by the reference number 20, and, moving toward the right, a furnace 21 which is divided into Zone One or second station and Zone Two or third station, indicated respectively by the reference numbers 22 and 23. The furnace 21 has an entrance 24 into Zone One and an exit, generally indicated at 25, from Zone Two. At the front side of the loading zone 20 there is located a first cyclic drive means or driving mechanism, generally indicated at 26 (FIG. 1), which drives a first conveyor 27 extending through the loading zone 20 and Zone One of the furnace 21. A second conveyor 28 extends through Zone Two of the furnace. Each of the first conveyor 27 and the second conveyor 28 comprises two sets of driven rollers 29 and 30, respectively. Outside the exit 25 of the furnace 21 there is located a tempering zone or fourth station and a tempering apparatus, generally indicated by the reference number 31, and beyond the tempering zone and apparatus 31 there is a pickup zone or fifth station, generally indicated by the reference number 32. A second cyclic drive means or driving mechanism 33 is located adjacent the pickup zone 32 and a third conveyor 34 extends through the tempering zone 31 and a pickup zone 32. The third conveyor 34 comprises two series of rollers 35. The first, second and third conveyors 27, 28 and 34, respectively, constitute conveyor means for transferring the molds through the five stations.

A return conveyor, generally indicated at 36, extends along a closed path leading from the pickup zone 32 up and back over the tempering zone 31 and the furnace 21 and down into the loading zone 20 and then back over the furnace 21 and tempering zone 31 at a lower level and returning to the pickup zone 32.

All the rollers 29 in each of the two series of rollers of the first conveyor 27 are linked to each other for simultaneous rotation by a linking chain 37. Similarly, all of the rollers 30 in each of the two series of rollers 30 of the second conveyor 28 and all of the rollers 35 in each of the two series of the third conveyor 34 are linked to each other by linking chains 38 and 39, respectively. The first conveyor 27 is driven by the first driving mechanism 26, in a manner later to be described, by the application of power to driven sprockets 40, there being one located at each side of the furnace 21. Through the linking chains 37 power is thus applied to all of the rollers 29 of the first conveyor 27. A coupling chain 41 is also engaged with a larger portion of the sprocket 40 and with a clutch generally indicated at 42. The clutch 42 may be actuated to couple the coupling chain 41 to the second conveyor 28 under conditions to be described later, so that the first conveyor 27 and second conveyor 28 may be driven together as a single unit when desired. Similarly, power is applied by the second driving mechanism 33 through double driven sprockets 43 to the linking chains 39 for driving all of the rollers 35 of the third conveyor 34 and through coupling chains 44 to a second pair of clutches 45 for coupling the second conveyor 28 to the third conveyor 34 under certain operative conditions. It is thus possible to drive the second conveyor 28 either in unison with the first conveyor 27 or in unison with the third conveyor 34 or all three of the conveyors may be driven simultaneously when both of the pairs of clutches 42 and 45 are engaged. Under these last conditions, all three of the conveyors 27, 28 and 34 function as a single conveyor, extending from the loading zone through the furnace 21, tempering zone 31 and pickup zone 32.

The furnace 21 is suitably provided with a multiplicity of burners, generally indicated at 46 supplied by sources of fuel and controlled by temperature regulators so as to establish and maintain different temperature levels in the two zones of the furnace. The burners for Zone One constitute first heating means, the attendant regulators constitute first control means, the burners for Zone Two constitute second heating means and the attendant regulators constitute second control means, it being intended that sheets of glass being treated shall be brought up to softening temperature in Zone One and then transferred into Zone Two for final treatment, including bending, and then transferred out of the furnace 21 to the tempering zone 31 for tempering. The tempertaure levels of the two Zones One and Two of the furnace are thus selected to accomplish the desired heating and bending in at least approximately the same length of time so that under most conditions the dwell of a piece of glass in Zone One will be not greatly longer than its dwell in Zone Two or the dwell in Zone Two of the preceding piece of glass. Conversely, the dwell in Zone Two, while often shorter than the dwell in Zone One, is always terminated at the end of the period of dwell of the successive piece in Zone One.

The furnace 21 has a pair of entrance doors 47 and 48 which close across the furnace entrance 24 and are actuated by the first driving mechanism 26, a pair of partitions 49 and 50 (FIG. 3) which divide Zone One from Zone Two and a pair of exit doors 51 and 52 which close the exit 25 of the furnace 21 and are driven by the second driving mechanism 33. When a piece of glass under treatment is to be moved from the loading zone 20 into Zone One, the first driving mechanism 26 is energized to open the entrance doors 47 and 48 and actuate the first conveyor 27 and through the clutches 42 the second conveyor 28. This moves the next previous sheet of glass from Zone One into Zone Two as well as moving the first piece of glass mentioned from the loading zone 20 into Zone One. Either prior to the actuation of the first driving mechanism or simultaneously therewith, depending upon operating conditions as will be described below, the second driving mechanism 33 was or is energized to actuate the third conveyor 34 for moving a piece of glass from the tempering zone 31 to the pickup zone 32 for opening the exit doors 51 and 52 and for energizing the second conveyor 28 to move the piece of glass in Zone Two out of the exit 25 and into the tempering zone 31. In FIG. 1, the doors 47, 48 and the doors 51, 52 are all shown open.

Under normal operations, a full complement of pieces of glass will consist of a just-loaded piece in the loading zone 20, a piece in Zone One undergoing initial heat treatment, a piece in Zone Two undergoing final heat treatment, and a piece in the tempering zone undergoing the tempering treatment. Each is moved one station by the actuation of the conveyors above described.

When the piece of glass is moved into the pickup zone 32 from the tempering zone 31, mechanism to be described below is energized for driving the return conveyor 36 to pick up the piece of glass just moved into the pickup zone and its mold carriage and transfer them up and back from the furnace 21 to the loading zone 20 where the operator removes the treated piece of glass and replaces it with an untreated piece of glass in preparation for the next cycle.

Conveyor construction

Each of the three conveyors 27, 28 and 34 consists of two opposite series of rollers 29, 30 or 35, respectively. Each of the rollers 29, 30 or 35 is mounted on the inner end of a stub shaft 53 or 54 (see also FIG. 3) of the first conveyor 27; 55 of the second conveyor 28, or 56 of the third conveyor 34. The stub shafts 54a in FIG. 2 are powered shafts driven by the double sprockets 40 which are keyed thereto. Each of the stub shafts 53 and 54 has its own individual driven sprocket 57 and all of the sprocket 57 on each side of the conveyor 27 are meshed with the respective linking chain 37. Each of the sprockets 57 is keyed to its own stub shaft 53, 54 or 54a, as the case might be. Similarly, each of the stub shafts 55 has its own driven sprocket 58 which is meshed with the linking chain 38, and those two stub shafts, indicated by the reference numbers 55a in FIG. 2, are the driving shafts for the second conveyor 28. In similar fashion, two stub shafts, indicated by the reference numbers 56a in FIG. 2, are the driving shafts for the third conveyor 34 and each of the stub shafts 56 and 56a of the third conveyor 34 has its own sprocket 59 engaged by the linking chain 39.

The double sprockets 40 are, as mentioned, engaged not only with power chains from the first driving mechanisms 26, which will be later described, but also with coupling chains 41. The coupling chains 41 are, in turn, engaged with sprockets of the clutches 42 and through the clutches 42 with the power shafts 55a of the second conveyor 28. Similarly, the power shafts 56a of the third conveyor 34 have their own sprockets 59 for the linking chains 39 and the double sprockets 43 which are driven by power chains from the second driving mechanism 33 and are engaged with the coupling chains 44 and through the clutches 45 may be engaged with the power shafts 55a of the second conveyor 28. All of the stub shafts of the conveyors 27, 28 and 34 are suitably journaled in bearings 60 supported on pairs of parallel beams 61 (FIG. 3) extending along both sides of the apparatus.

Furnace construction

The furnace 21 comprises a heavy support frame including upright beams 62 to which the parallel beams 61 are rigidly connected, cross beams 63 and miscellaneous structural members including longitudinally extending support beams 64. All of the steel work functions to mount and support the refractory lining elements including a bottom 65, walls 66 and a top 67. The main cross beams 63 also dependingly support the upper partition 50 (FIG. 3) which is similarly fabricated from refractory material and is illustrated as being attached to the cross beam 63 by a plurality of struts 68 with cross rods 69 extending through the struts 68 and through the upper partition 50. The lower partition 49 is braced by suitable means (not shown) and supported on the floor 65 which rests, in turn, upon lower cross beams 70. The top edge of the lower partition 49 and the bottom edge of the upper partition 50 (FIG. 3) are so contoured as to provide an opening, generally indicated at 71, between Zone One and Zone Two of the furnace of such size and configuration as to provide for the passage therethrough of the individual mold carriages each carrying its mold and sheet of glass.

Although a sag mold carriage 72 is illustrated for handling sheets of bent glass having two sharply bent wings, the invention has equal utility in the heating and tempering of sheets of glass having single bends, slight bends or no bends at all. Because any bend is the result of sagging when the glass is softened under heat, deep bent sheets are formed in generally horizontal arrangement slightly bent sheets in inclined relationship and flat sheets vertically, since no bend is to take place. Compensatory changes in the furnace and tempering stations would be made for these different shapes and arrangements.

Mold carriage

The furnace embodying the invention is designed to operate with a plurality of mold carriages, one of which is generally indicated in FIG. 3 by the reference number 72, and a second shown in FIG. 6 and indicated by the reference number 72a. Each of the mold carriages 72 comprises a pair of main frame members 73 extending in parallel spaced vertical planes and connected at their outer ends by transversely extending parallel rails 74. Each carriage 72 mounts a bending mold comprising a center section 75 and a pair of wings 76 which are hingedly connected to opposite sides of the center section 75 along hinge lines parallel to the rails 74 and parallel to the direction of movement of the mold carriages 72 through the furnace 21. The wings are movable from generally horizontal positions as shown in FIG. 3 to upright bent positions as shown in FIG. 6. The surface contours of the center section 75 and wings 76, when in their upper positions (FIG. 6), determine the final bent configuration of the sheet of glass being treated, one of which is indicated by the reference number 77 in FIG. 3 wherein the glass sheet is flat and 77a in FIG. 6 wherein the glass is shown in its final bent form. Each of the mold carriages 72 is illustrated as being provided with a set of weights 78 mounted on the inner ends of lever arms 79 pivoted at the ends of the center section 75 and connected to the wings 76 so as to urge the wings upwardly when the glass sheet softens in Zone Two of the furnace.

Each of the mold carriages 72 travels through the apparatus by reason of the engagement between the various rollers 29, 30 and 35 of the three conveyors 27, 28 and 34 with the two spaced carriage rails 74 which run on the sets of rollers 29, 30 and 35. Each of the mold carriages 72 has a hanger, generally indicated at 80, at each of its ends. The hangers 80 are so positioned and designed as to be engageable by lifting dogs 81 (see FIG. 14) of the return conveyor 36 in the pickup zone 32, and so as to be automatically disengaged from the lifting dogs 81 of the return conveyor 36 in the loading zone 20 when the carriage 72 is lowered onto the rollers 29 of that portion of the conveyor 27 extending into the loading zone 20.

*Furnace doors*

As briefly mentioned above, the furnace 21 of apparatus according to the invention as illustrated in the drawings has a pair of entrance doors 47 and 48 and a pair of exit doors 51 and 52. These two sets of doors are substantially identical in both their construction and their operation so the following description of the entrance doors 47 and 48 and the mechanism for actuating the entrance doors is intended to serve as a description of both such sets of doors and mechanisms.

The entrance doors 47 and 48 (FIGS. 4 and 5) are constructed from heavyweight steel frames which enclose a mass of refractory material 82, the surfaces of the doors 47 and 48 being formed by sheet metal panels 83. Each of the doors 47 and 48 has a plurality of guide shoes 84 which slide on vertical rails 85 one at each side of the furnace entrance 24 and which are part of the main frame construction of the furnace 21. The upper door 48 has a downwardly protruding key 86 at its lower center and the lower door 47 has a complementary key notch 87 to guide the two doors into close adjacency when they are closed. The two doors 47 and 48 are hung by a pair of counterbalancing chains 88 one end of each of the chains 88 being fixed to the side of the lower door 47 by a bracket 89 and the other ends of the chains 88 being connected to the upper door 48 by a similar pair of brackets 90. The chains 88 go up and over a pair of sprockets 91 which are keyed or otherwise secured near the opposite ends of a horizontal cross shaft 92. The cross shaft 92 is journaled in bearings 93 on the upper ends of two of the main upright beams 62 of the furnace frame. Each of a pair of idler sprockets 94 is journaled on a stub shaft 95 which protrudes inwardly from one of the beams 62 near its upper end. The counterbalancing chains 88 thus suspend both of the doors 47 and 48 in their rails 85, the weight of one door 47, for example, being offset by the weight of the other door 48.

A drive sprocket 96 is secured on one end of the cross shaft 92 and is engaged with a door drive chain 97. The drive chain 97 passes around two small idler sprockets 98 and 99 (FIG. 5) and extends toward the front of the furnace in two parallel spans indicated by the reference numbers 97a and 97b toward the first driving mechanism 26 which, as mentioned above and described in detail below, applies power to the door drive chain 97 to open and close the doors 47 and 48 when the furnace is to be open to permit the entry of a mold carriage 72 through the entrance 24 and into Zone One of the furnace 21.

The mechanism for supporting and actuating the exit doors 51 and 52 is substantially identical with that just described with respect to the entrance doors 47 and 48 so that no description of the exit doors or driving mechanism will be given.

*Tempering apparatus*

The tempering apparatus 31 is shown in simplified form in FIG. 1 and in detail in FIGS. 6 and 9. As explained above, the tempering apparatus 31 is located in the tempering zone just outside the furnace exit 25 and ahead of the pickup zone 32. Mold carriages 72 are moved into and out of the tempering zone by the third conveyor 34, with the carriages 72 riding on the driven rollers 35 of the third conveyor 34.

In FIG. 6 the carriage 72a is shown in position in the tempering zone and apparatus, generally indicated by the reference number 31. The tempering apparatus is supplied with air under pressure from an upper air duct 100 and a lower air duct 101. The apparatus 31 includes an upper plenum chamber, generally indicated at 102, which is connected to the upper air duct 100 by a flexible connection illustrated in the drawings as being simply a flexible sleeve 103. The apparatus 31 also has a lower plenum chamber 104 connected to the lower air duct 101 by a similar flexible sleeve 105. The upper plenum chamber 102 is provided with a plurality of air nozzles 106 arranged in a group with the ends thereof lying along a line designated 106a in FIG. 6. The lower plenum chamber 104 has a similar plurality of nozzles 107 similarly arranged with their ends lying along a line designated by the reference number 107a. The nozzles 106 and 107 are spaced from each other and are opposed. The generally arcuate space between the ends of the groups of nozzles 106 and 107 is of such shape and size as to accept a carriage 72 with the mold having the wings 76 in their upper position as illustrated in FIG. 6. The nozzles 106 and 107 are directed toward opposite sides of the sheet of glass 77a on the carriage 72a in the tempering apparatus 31 for the purpose of impinging a multiplicity of jets of cold air against the heated surfaces of the sheet of glass in order to chill and temper the glass in the sheet.

In order to prevent the developing of stress lines and subsequent failure, the nozzles 106 and 107 are oscillated relative to the sheet of glass 77a in order to insure uniform chilling of its surfaces. The upper plenum chamber 102 is supported by an open framework 108 including vertical struts 109 erected upon an open bottom frame 110 which also supports the lower plenum chamber 104. The bottom frame 110 has two side frames 111 each of which mounts a pivot bar 112 at each end. Four pairs of parallel links 113 are suspended from similar pivot bars 114 which are carried by heavy overhead beams 115. The framework 110 is oscillated by a connecting rod 116 driven from an eccentric 117 on a motor or power source 118. Energization of the power source 118 rotates the eccentric 117 and through the connecting rod 116 oscillates the frame 110 in a path determined by the parallel links 113 to sweep the air jets delivered by the nozzles 106 and 107 back and forth across the surface of the bent sheet of glass 77a in the tempering apparatus 31.

*Return conveyor*

The return conveyor 36 is shown in elevation and simplified form in FIG. 1 and certain details thereof are illustrated in FIGS. 12–15.

The return conveyor 36 comprises a pair of continuous chains 119 each of which runs on a group of sprockets and guides at one side of the apparatus and extends downwardly into the loading zone 20 and downwardly into the pickup zone 32. Each chain 119 is engaged with a return sprocket 120 (see also FIG. 14) in the pickup zone 32, a vertical guide rail 121 and an arcuate guide 122 located above the pickup zone 32 in an overhead framework, generally indicated at 123, which is erected above the apparatus. After leaving the guide 122 the chain 119 runs along a horizontal rail 124 at the top of the respective side of the framework 123 and around a second arcuate guide 125 and along a vertical guide rail 126, thence downwardly into the loading zone 20. In the loading zone 20 (see also FIG. 12) the chain 119 passes around a drive sprocket 127 and thence upwardly over a guide sprocket 128 and an idler sprocket 129 and along a lower horizontal rail 130 extending horizontally along the bottom side of the framework 123 just above the furnace apparatus. At the far side of the rail 130, the chain 119 travels around an idler sprocket 31 and a guide sprocket 132 and then back to the return sprocket 120.

The return conveyor 36 is driven from the drive sprocket 127 (FIGS. 12 and 13) which is secured on the end of a stub shaft 133 that is rotatably mounted in a bearing bracket 134 supported by a horizontal beam 135 of the framework 123. A drive chain sprocket 136 is pinned on the shaft 133 and meshed with a drive chain 137 which is also engaged with a power sprocket 138 mounted on the output shaft of a gear box 139 driven by a return conveyor motor 140.

In the pickup zone 32 (FIGS. 14 and 15) the return sprocket 120 is similarly pinned on an idler shaft 141 which is similarly journaled in a suspension bracket 142 dependingly mounted on the underside of a horizontal beam 143.

The return conveyor chains 119 jointly mount and support the pair of lifting dogs 81 which are illustrated in detail in FIG. 15. Each of the lifting dogs 81 consist of two closely adjacent roller bearings 144 which are mounted circumjacently to a hollow cross rod 145. The roller bearings 144 are positioned on the cross rod 145 by a stop collar 146 and a sleeve 147. The sleeve 147 is positioned around the end of the cross rod 145 adjacent a track roller 148. The sleeve 147 and track roller 148 are retained in position at the end of the cross rod 145 by a tenoned pin 149 which is inserted in the open end of the cross rod 145. The pin 149 has an enlarged rim 150 bearing against the inner race of the track roller 148 and extending through a link 151 in the return conveyor chain 119. The inner end of the pin 149 is pinned or otherwise secured to the cross rod 145 so that the cross rod 145 functions to connect the two individual links 151 of the two return conveyor chains 119 to each other from opposite sides of the apparatus.

Each of the mold carriages 72 is equipped with two hangers 80, each of the hangers 80 having a side elevation resembling an inverted L with an arcuate recess 152 cut in the underside of its horizontal arm. The hangers 80 and their recesses 152 lie in the path of movement of the two lifting dogs 81, as can best be seen by reference to FIG. 14.

In the loading zone 20 the driven sprockets 127 are so located with respect to the loading position of a mold carriage 72 that as the return conveyor chains 119 move downwardly each carriage 72 is deposited on the first conveyor rollers 29 and the continued movement of the conveyor chains 119 around the driven sprockets 127 carries the lifting dogs 81 and their cross rod 145 out from beneath the horizontal arms of the hangers 80. During a previous cycle the return conveyor 36 has moved its chains 119 to the point in the pickup zone 32 illustrated in FIG. 14 so that the lifting dogs 81 and their cross rod 145 have moved around the return sprockets 120 past the center thereof. After the return conveyor chains 119 are moved to the position illustrated in FIG. 14 the return conveyor motor 140 is de-energized to stop the dogs 81 in that position. At the beginning of a subsequent cycle of operation, as will be further explained below, the mold carriage 72 previously located in the tempering zone 31 is moved by the third conveyor 34 to the position of FIG. 14 with the horizontal arms of the hangers 80 moving in, over the lifting dogs 81 and their cross rod 145. Upon arrival of the carriage 72 at this position a suitable switch is actuated (see operating description below) to energize the return conveyor motor 140 and start the return conveyor chains 119 moving. Immediately after the beginning of movement of the chains 119 the lifting dogs 81 are moved vertically up and into engagement with the arcuate recesses 152 of the hangers 80, lifting the particular mold carriage 72 off of the rollers 35 and starting it upwardly on its return trip to the loading zone 20.

The track rollers 148 engage and run along the vertical rails 121 out of the pickup zone 32 around the arcuate guides 122, along the upper horizontal rails 124 and around the arcuate guides 125 and down the vertical guide rails 126 to the position indicated in FIG. 12. After depositing the mold carriage 72 in the position indicated in FIG. 12, the return conveyor chains 119 carry the lifting dogs 81 upwardly and around the various sprockets, along the horizontal guide rail 130 and finally back to the position illustrated in FIG. 14.

*Driving mechanisms*

The first and second driving mechanisms generally indicated in FIG. 1 at 26 and 33 are substantially identical in construction with the exception of the location of the sprockets 40 (first mechanism 26) and 43 (second mechanism 33) which require some variation between the directions in which certain power chains extend to drive these sprockets. Each of the driving mechanisms 26 and 33 performs two major operations: first, it applies power at the proper time to the respective one of the door operating mechanisms and second, it applies power to either the first or third conveyor depending upon which of the mechanisms is under consideration.

Refering now to FIGS. 7 and 8, the first driving mechanism 26 is illustrated in FIG. 7 in solid lines at its stop or 0° position and in broken lines at the position 270° away from stop position. In FIG. 8 the same driving mechanism 26 is illustrated in solid lines at a position 90° away from stop position and in broken lines at a position 180° away from stop or rest position.

The driving mechanism 26 comprises a bull gear 153 which is journaled by a heavy shaft 154 in a pair of bearings 155 that are in turn mounted upon cross frame members 156. The bull gear 153 is driven by a drive pinion 157 mounted on the output shaft of a speed reducer 158 which is in turn driven by a belt 159 from a first drive mechanism motor 160. A walking beam mechanism comprises a power arm 161 which is bolted to the bull gear 153 and a walking arm 162 pivotally connected to the end of the power arm 161 by a connecting pin 163. The upper end of the walking arm 162 is guided by a guide roller 164 which travels up and down in an inclined track 165 mounted on and held in place by various elements of the steel overhead frame work 123. As the bull gear 153 rotates, the power arm 161 is swung around through 360° thrusting the walking arm 162 upwardly, then pulling it back downwardly and then returning it to the 0° position illustrated in solid lines in FIG. 7.

The walking arm 162 has a slotted catch plate 166 rigidly mounted on its rear side with a slot 167 opening toward the direction of a power chain generally indicated at 168. The power chain 168 carries a plurality of dogs 169 one of which is shown in detail in FIG. 11. Each of the dogs 169 comprises a pair of rollers 170, the rollers 170 being secured on opposite ends of a pin 171 forming a part of chain link 172. In FIG. 7 one of the dogs 169 (indicated by the reference 169a) is shown in stop or rest position, i.e., with the bull gear 153 at 0° and the walking arm 162 ready to start its upward movement along the guide track 165. In the stop position that one of the dogs indicated by the reference number 169a is caught in the lower notched end of a hook 173, the hook 173 being pivotally mounted in a side member 174 of the framework 123. The hook 173 has a counterweight 175 at its upper end, the weight 175 extending in such a direction that it tends to swing the hook 173 in a clockwise direction so that the notch in its lower end 176 in line to catch and hold a downwardly moving dog 169 of the power chain 168 so as to catch the dog 169 in the hook 173 at the end of the cycle of movement of the power chain 168. The hook 173 has a positioning stop 177 which adjusts the limit of movement of the hook 173 in a clockwise direction under the influence of the counterweight 175 so as to perfectly align the lower end 176 of the hook 173 with the path of movement of the dogs 169 of the power chain 168.

When the motor 160 is energized, and through the speed reducer 158, the bull gear 153 is rotated from stop position (FIG. 7) in a clockwise direction, the power arm 161 starts to swing from the position in solid lines in FIG. 7 upwardly toward the solid line position of FIG. 8. This starts the walking arm 162 in an upward movement until the upper right hand corner of the catch plate 166 strikes a beveled nose 178 on the lower side of the lower end 176 of the hook 173. Engagement of the upper corner of the plate 166 with the beveled nose 178 cams the hook 173 in a counter-clockwise direction against the action of the counterweight 175, releasing that one of the dogs 169 previously caught in the hook 173. At this point the slot 167 in the plate 166 captures that dog 169, as is illustrated in solid lines in FIG. 8. Continued rotation of the bull gear 153 and the power arm 161 then straightens out the walking beam mechanism aligning the power arm 161 with the walking arm 162 and insuring firm entrance of the dogs 169 into the slot 167.

Immediately after the position illustrated in FIG. 8, with continued rotation of the bull gear 153 and power arm 161, the power arm 161 pulls the walking arm 162 downwardly toward the position indicated in the dotted lines in FIG. 8. Through engagement of the dog 169 in the slot 167, the power chain 168 is pulled downwardly at its left span through a driving cycle commencing at the moment that the power arm 161 and walking arm 162 pass "over center" in a clockwise direction and terminating when the power arm 161 and walking arm 162 reach the 270° position shown in dotted lines in FIG. 7, i.e., when the walking arm 162 reaches the bottom limit of its downward travel. As shown in FIG. 7 in dotted lines, at this position of the driving mechanism, the slotted plate 166 still retains engagement with that one of the dogs 169 on which it has been pulling, but the dog 169 has returned to the right, open end of the slot 167 so that the angular translation of the walking arm 162 from the position illustrated in FIG. 7 in dotted lines toward the left disengages the slotted plate 166 from the dog 169, disconnecting the driving mechanism from the power chain 168 and leaving the power chain 168 in the position with a subsequent dog caught in the hook 173 ready for the next cycle of operation.

The power chain 168 is engaged with a plurality of guide and idler sprockets including an upper guide sprocket 179 and a lower guide sprocket 180 which determine the straight line path of movement of the span of the chain 168 along which the driving force is applied thereto. The lower guide sprocket 180 is mounted on a stub shaft 181 journalled by bearings (not shown) supported on a support frame by the side member 174 of the framework 123. The upper guide sprocket 179 is pinned on a shaft 182 which is journalled by pillow blocks 183 carried on knee bracket 184 by the side members 174 of the framework 123. The shaft 182 extends horizontally across the apparatus from one side of the furnace to the other so that there are two pillow blocks 183 and knee brackets 184, one at each side of the apparatus. The shaft 182 extends across the apparatus parallel to and in front of the shaft 92 (FIG. 4) of the door operating mechanism. Thus the movement of the power chain 168 by the driving mechanism 26 also rotates the shaft 182 and a sprocket (not shown) on the end of the shaft 182 opposite to the sprocket 179.

A transmission chain 185 (FIG. 4) is engaged with the sprocket (not shown) on the end of the shaft 182 and with the smaller section of the driven sprocket 40 on the shaft 54a at that side of the machine. Similarly the power chain 168 (FIGS. 4 and 8) is engaged with the smaller portion of the driven sprocket 40 mounted on the shaft 54a at the front side of the machine (FIGS. 1 and 8). The power chain 168 also runs around three idler sprockets 186, 187 and 188 so as to engage with the driven sprocket 40 on the proper side to produce forward movement of the linking chain 37 and the coupling chain 41 on that side of the apparatus.

The second driving mechanism 33 (FIG. 1) is substantially identical with the first driving mechanism 26 with only a few changes required by reason of its position at the exit end of the apparatus rather than its position at the entrance end. The second driving mechanism includes a bull gear 189 to which is bolted a power arm 190 and a walking arm 191 is pivotally connected thereto. A power chain (not shown) is driven by the second driving mechanism 33 in the same manner as the power chain 168 of the first driving mechanism 26 but the power chain (FIG. 1) runs around a pair of idler sprockets (not shown) and extends forwardly past the tempering station 31 along the far side of the machine (FIG. 1) and is engaged with a smaller section 192 (FIG. 2) of the double sprocket 43 at the side of the machine opposite the side of the machine on which the first driving mechanism 26 is located. The power chain of the second driving mechanism 33 also is engaged with an upper guide sprocket on a cross shaft 193 extending across the machine and including on its forward end a sprocket 194 carrying a transmission chain 195 which is engaged with a smaller section 196 of the double sprocket 43 located at the front side of the machine (FIG. 2). Thus the second driving mechanism 33 applies power to both of the double sprockets 43 on the shafts 56a and to the linking chains 39 and the coupling chains 44.

Both of the driving mechanisms 26 and 33 have as their main function the powering of the first and third conveyors, respectively, to move the carriages 72 from station to station, the first and third conveyors being coupled to the second conveyor when necessary as explained above. To this end the driving mechanisms 26 and 33 produce a sine wave motion accelerating the power chains 168 and 195 and thus the carriages 72 slowly from a stop position with a rapid increase in speed and a rapid reduction in speed to slowly bring them to the next stop position. The sine wave acceleration and deceleration eliminates any sudden jarring of the mold carriages and thus the possibility that any of the sheets of glass carried thereby may be jarred out of place in the carriages 72. The sine wave motion also provides for overcoming the inertia and momentum of the carriages without sudden impacts on any of the structural members.

In addition to their primary function of actuating the first and third conveyors, the driving mechanisms 26 and 33 also provide power for operating the door opening mechanisms of the entrance doors 47 and 48 and the exit doors 51 and 52, respectively. To this end each of the bull gears 153 and 189 carries a door actuating roller 197 on its side opposite the power arm 161 or 190, respectively. The door actuating roller 197 engages with a pair of Geneva channels 198 and 199. At rest or zero degree position the power arm 161 (FIG. 7) extends horizontally and the slotted plate 166 of the walking arm 162 is not engaged with any of the dogs 169 of the power chain 168. At this position the door actuating roller 197 is located at and engaged with the ends of both of the Geneva channels 198 and 199 which extend horizontally and are aligned with each other. This is the door closed position of the door actuating mechanism so that at zero degrees in the cycle, the two entrance doors 47 and 48 are closed. Similarly, of course, the second drive mechanism 33 is positioned so that the exit doors 51 and 52 are also closed during rest position of the driving mechanism 33.

Each of the Geneva channels 198 and 199 is attached to a large sprocket 200, the two sprockets 200 being journalled on parallel shafts 200a by bearings 201 supported on the underside of the same horizontal frame member which supports the roller shafts 53 in the loading zone. The door drive chain 97 of the entrance door mechanism is engaged with both of the large sprockets 200, its upper span 97a (see also FIG. 5) being guided downwardly into engagement with the top side of the first sprocket 200 by a pair of idler sprockets 202 (FIG. 8). The chain 97 thence passes over the first large sprocket 200 of the Geneva channel 198 and under the large sprocket 200 of the Geneva channel 199 and then over a guide sprocket 203. The lower span 97b of the chain 97 then departs horizontally from the guide sprocket 203 and extends across to the idler sprocket 99 (FIG. 5).

The initial rotation of the bull gear 153 inserts the door actuating roller 197 into the Geneva channel 199 (clockwise movement from the position shown in solid lines in FIG. 7). This rotates the large sprocket 200 in a counterclockwise direction pulling on the chain 97 placing the upper span 97a in tension and rotating the drive sprocket 96 (FIG. 5). This moves the counterbalancing chains 88 to raise the upper entrance door 48 and lower the lower entrance door 47 to the open position illustrated in FIG. 5. The open door position corresponds to the 90° position shown in solid lines in FIG. 8 and at this position of the mechanism the door actuating roller 197 is just departing from the Geneva channel 199.

During the rotation of the bull gear 153 from 90° position to 270° position the door actuating roller 197 moves from the point of departure from the Geneva channel 199 to the point of entrance into the Geneva channel 198 illustrated in broken lines in FIG. 7. It is during this 180° of movement from the 90° position, with the door open, to the 270° position, with the door still open, that the walking arm 162 engages its slotted plate 166 with a dog 169 of the power chain 168 to produce movement of the first conveyor. Thus when a cycle commences, the first 90° of movement of the drive mechanism 26 opens the entrance doors 47 and 48. The 180° of movement from 90° to 270° engages and moves the first conveyor 27 to move a carriage 72 from the loading zone 20 into Zone One of the furnace. The final 90° of rotation of the bull gear 153 and door actuating roller 197 inserts the roller 197 into the Geneva channel 198 and swings it in a counterclockwise direction to rotate the large sprocket 200 to which it is attached in the same direction. This applies tension to the lower span 97b of the door drive chain 97 to reverse the direction of the drive sprocket 96 and to lower the upper entrance door 48 and to raise the lower entrance door 47. When the final 90° of rotation of the bull gear 153 and door drive sprockets 200 is completed the drive mechanism reaches zero position, the entrance doors 47 and 48 are closed and the whole drive mechanism 26 and its connected parts are restored to rest position waiting a subsequent cycle of movement.

*Control circuit*

Apparatus embodying the invention may be controlled in either of two different ways. In the first of these systems of control the duration of the dwell of a mold carriage 72 in Zone Two of the furnace is under the control of sensing means which in the embodiment shown in the drawing comprises a photocell apparatus generally indicated in FIG. 16 by the reference number 204 and including a light source 205 (see also FIGS. 1 and 17) and a photocell 206. The beam of light from the light source 205 is directed across the furnace and impinges upon the photocell 206. When the sheet of glass in the mold 72 of Zone Two of the furnace sags in its center to the desired degree as the wings 76 swing to their upper position, the light beam is cut off. The function of this photocell apparatus for this purpose is the subject matter of and is more fully disclosed in the said McMaster applications Serial Nos. 21,225 and 414,294 and reference is made thereto for details of its operation.

In this first method of the operation of the instant apparatus the duration of dwell of a carriage 72 in Zone One of the furnace is under the control of a cyclic timer generally indicated in FIG. 16 by the reference number 207. The period or cycle for which the timer 207 is set is selected to be as long as the longest period of time necessary for the dwell of a sheet of glass in Zone Two which has the maximum thickness expected to be encountered in the series of glass sheets to be treated. Therefore every sheet of glass entering Zone One is exposed to the heat in Zone One for the same period of time. If the sheet is thin it will be heated in Zone One for a period slightly longer than that necessary to condition it for bending in Zone Two. Therefore when the thin sheet is shifted into Zone Two it will sag to its final mold position in a shorter length of time than average. However, because the duration in Zone Two of the furnace is under the control of the photocell in the manner mentioned, it will be removed from Zone Two as soon as it reaches its final form. If, on the other hand, the sheet of glass in Zone One is thicker than average, its dwell in Zone One will still condition it for bending in Zone Two within the period of time required to raise a second sheet in Zone One to the proper condition. When the thicker sheet of glass enters Zone Two having been in Zone One for a full period of time, it will have reached a condition such that it can be expected to sag to its final form within a period of time allotted for the next sheet in Zone One. In short, the control circuit in the first arrangement is such that a sheet under treatment in Zone Two may be moved out of Zone Two after a period of time less than a standard period of time for the dwell of a sheet in Zone Two, but in any event the sheet in Zone Two will be removed therefrom upon the expiration of the period of time controlled by the timer 207.

The apparatus as controlled by the circuit illustrated in FIG. 16 may also be operated in a second manner in which the amplifier of the photocell apparatus 204 is entirely removed from the control circuit and control of both Zone One and Zone Two is exercised by the timer 207. This second system of operation is used where the degree of uniformity of the glass sheets being treated is high, and little, if any, variation between the times necessary for their conditioning and bending is to be encountered.

The control circuit of FIG. 16 includes a main switch 208 by which the circuit is energized and a photocell switch 209 by which it is determined whether or not photocell control is to be exercised over the glass in Zone Two of the furnace. The photocell control system comprises not only the photocell apparatus 204 with its associated light source 205 and photocell 206 but also a second photocell apparatus 210 having a light source 211 and a photocell 212. The second photocell apparatus 210 (see FIGS. 1 and 2 for location) functions for determining whether or not there is a mold carriage 72 in Zone Two of the furnace at any time during the cycle of operations. It should be noted that the photocell apparatus 210 closes its relay 213 when the switch 209 is open, de-energizing the apparatus 210, in order that the line from the timer 207 to the clutch 45 will be closed under these conditions as will later be explained.

The control circuit also includes a number of limit switches each of which has certain functions and is located in a certain position as it tabulated below.

*Limit Switch 1:*
  *Location.*—LS–1 is located (FIG. 8) adjacent the path of movement of the Geneva channel 198.
  *Function.*—LS–1 is closed by the Geneva channel 198 when the door opening movement of the drive mechanism 26 is completed and functions to supply power to start the timer 207 to initiate a heating cycle.

*Limit Switch 2:*
  *Location.*—LS–2 is located adjacent the path of movement of the Geneva channel 198 (FIG. 7) and is actuated when the doors are fully closed.
  *Function.*—LS–2, when actuated by the Geneva channel 198, functions to cut off current to a relay 214 (FIG.

16) and to discontinue the operation of the first driving mechanism 26 after the entrance doors are closed.

*Limit Switch 3:*

Location.—LS–3 is located in the second driving mechanism 33 in the same position therein as LS–2 occupies in the first driving mechanism 26 but is not illustrated in the drawings.

Function.—Identical with LS–2 except that it cuts off current to a relay 215 thereby stopping the operation of the second driving mechanism 33.

*Limit Switch 4:*

Location.—LS–4 is located in the pickup zone (FIG. 14) in line to be actuated by the lifting dog 81.

Function.—LS–4 is opened to cut off current to a relay 216 and to the power circuit of the return conveyor 36, when the lifting dogs 81 are in position to pick up a subsequent carriage 72 (FIG. 14).

*Limit Switch 5:*

Location.—LS–5 is located in the loading zone (FIG. 12) adjacent the path of movement of the carriage 72 and is actuated by a car rail 74.

Function.—LS–5 is inserted in the hold-in power line for relay 216 in series with LS–4 and parallel to LS–6 and functions to open this line if a car is in the loading zone. LS–5 in combination with LS–6 prevents a subsequent carriage 72 from being delivered to the loading zone until the previous carriage 72 has been loaded and moved into Zone One of the furnace.

*Limit Switch 6:*

Location.—LS–6 is located in the overhead framework 123 (FIG. 1) along the horizontal rail 124 near the loading zone end of the apparatus in line to be actuated by the return conveyor dog 81.

Function.—LS–6 is located in the hold-in circuit in parallel with LS–5 and functions with LS–5, as mentioned, to prevent a carriage being moved into the loading zone 20 by the return conveyor 36 before the previous carriage is moved out of the loading zone.

*Limit Switch 7:*

Location.—LS–7 is located in the pickup zone (FIG. 14) in line to be engaged by one of the rails 74 of a carriage 72.

Function.—LS–7 is in the main circuit to relay 216 functioning to energize the return conveyor 36 upon the arrival of a carriage in pickup position.

A pushbutton 217 is connected in the main line to the relay 216 in parallel with LS–7 in order to permit manual energization of the return conveyor when it is desired.

Each of the main control relays 214, 215 and 216, as well as a fourth control relay 218, has a group of three normally open contacts 219, 220, 221 and 222, respectively. Each of the groups of contacts 219–222 controls the power circuits to the related one of the first driving mechanism 26, second driving mechanism 33, return conveyor 36 or blast head oscillator motor 118. The blast head oscillator power circuit is controlled by a main switch 223 which is manually closed when the operator desires the blast head to be oscillated, as for example at the beginning of the third cycle after start up or when the first sheet of glass is moved into the tempering zone 31.

Each of the control relays 214, 215 and 216 also has a single normally open contact 224, 225 or 226, respectively, which functions as a "lock-in" for the respective one of the relays. In addition, the control relay 214, which controls the energization of the first driving mechanism, has a normally closed contact 227 and a normally open contact 228. The normally closed contact 227 is opened when the relay 214 is energized and thus breaks the line leading from a relay 229 of the photocell apparatus 204 to prevent the photocell apparatus 204 from starting the second driving mechanism 33 while the first driving mechanism 26 is running. Normally open contact 228 of relay 214 is connected in the circuit leading to relay 215 for the second driving mechanism 33 in parallel with normally closed contact 217 whose function was just described. However, normally open contact 228 closes when the first driving mechanism is running thus establishing a circuit to start the second driving mechanism when the first driving mechanism starts if a carriage 72 signals its presence in Zone Two of the furnace and the relay 213 of the photocell apparatus 210 is then closed. In addition, if the apparatus is operating in the second fashion (entirely under the control of the timer 207) when the timer closes its main switch and energizes control relay 214 to start the first driving mechanism, current also flows through the contacts of relay 213 (closed under these circumstances) and through now closed contacts 228 directly to the lines leading to control relay 215 so that the second driving mechanism starts and runs with the first driving mechanism.

In this connection it should also be noted that the clutch 42 is connected between one side of the power line and the line under the control of the timer 207. Therefore whenever the control relay 214 is energized by the closing of the timer contact, clutch 42 is also energized to couple the first conveyor 27 to the second conveyor 28 so that they run in unison. Similarly the clutch 45 is connected in parallel with the coil of control relay 215 so that when relay 215 is energized, current also flows to the clutch 45, thus coupling the second conveyor 28 to the third conveyor 34 so that whenever the third conveyor 34 is operating the second conveyor 28 is also running. It follows necessarily therefore that if the presence of a carriage in Zone Two of the furnace closes the relay 213 of the photocell apparatus 210 and through contacts 228 causes the second driving mechanism 33 to be energized when the first driving mechanism 26 is energized, both of the clutches 42 and 45 will be energized and all three of the conveyors 27, 28 and 34 will operate as a single unit. This also occurs, of course, if the mechanism is operating entirely under the control of the timer 207 without the use of either of the photocell apparatus 204 (glass sag signal) or 210 (carriage presence in Zone Two signal). Whether or not the photocell apparatuses 204 and 210 are included in the circuit depends entirely upon whether or not the selector switch 209 is closed or opened since power to these two apparatuses is provided only through the switch 209.

*Operating cycle*

As discussed above, apparatus embodying the invention may be operated in either of two ways. In a first system the duration of dwell of the glass in Zone One is under the control of the timer 207 and the duration of dwell of glass in Zone Two is under the control of the photocell apparatus 204 with a maximum dwell determined by the period of dwell in Zone One. In a second system the entire apparatus is under the control of the timer 207 and the conveyor mechanisms are linked together so that all pieces of glass dwell in each zone of the furnace for the same period of time.

Under either of the two operating systems, the timer 207 is energized to start a controlled period of time by the closing of LS–1 which occurs when the entrance doors 47 and 48 reach their fully open position. The length of the time period controlled by the timer 207 is selected to include a sufficient length of time for the first driving mechanism 26 to move a carriage from the loading zone 20 into the first zone of the furnace and for the entrance doors 47 and 48 to again close plus enough time for the treatment of the glass in Zone One of the furnace. The period thus totals the treatment period in Zone One plus the time necessary for the first driving mechanism 26 to move from 90° position to 0° position.

*First operating system.*—Assume that the furnace is operating and a piece of glass is in a carriage 72 in Zone Two of the furnace undergoing final heat treatment. Under these conditions, of course, both the entrance doors 47 and 48 and the exit doors 51 and 52 of the furnace 21 are closed so that both LS–2 and LS–3 are opened preventing either of the driving mechanisms 26 or 33 from operating when the furnace doors are closed. After a lapse of time, determined as discussed above, by the thickness of the glass and its consequent heat reaction in the furnace, the glass sheet sags sufficiently to signal the photocell 206 of the photocell apparatus 204. When the signal is received the relay 229 is energized closing its contact. Current flows from one side of the line designated by the reference number 230 through the selector switch 209 (which, of course is closed) and to the contact of the relay 229, thence through normally closed contacts 227 and a connecting line 231 to the coil of the control relay 215 and to the clutch 45 and then to the other side of the line indicated by the reference number 232. This closes the set of three contacts 220 energizing the second driving mechanism 33 which begins to open the exit doors 51 and 52. Immediately thereafter LS-3 closes establishing a lock-in circuit for the relay 215 through contacts 225, also closed when the relay 215 was first energized. During this initial period of operation of the second driving mechanism 33, of course, the exit doors 51 and 52 are being opened and the third conveyor 34 is not running so the glass remains in Zone Two of the furnace and the photocell apparatus 204 holds its contacts of relay 229 closed to hold the relay 215 in circuit. The second driving mechanism continues running from 90° position to 180° position which moves the carriage out of Zone Two into the tempering zone 31 and moves the carriage 72 previously in the tempering zone 31 into the pickup zone 32. The second driving mechanism 33 continues to run in the last quarter of its cycle from 270° to 0° closing the exit doors 51 and 52 until they reach final closed position and LS-3 is reopened. Because no signal is now received in the photocell apparatus 204, opening of LS-3 breaks the circuits to control relay 215 dropping out its various contacts and stopping the second driving mechanism 33. LS-3 is now again open awaiting a subsequent cycle.

Arrival of the carriage 72 in the pickup zone 32 closes LS-7. Current flows from the side of the line 230 through LS-7 to the coil of relay 216 and the opposite side of the line 232. This closes the set of contacts 221 to energize the power circuit for the return conveyor 36 and also closes contacts 226 to lock in the relay 216 through LS-4 and either LS-5 or LS-6. Because the stop position of the lifting dog 81 of the return conveyor 36 is below and spaced from the horizontal arm of the hangers 80, the return conveyor 36 operates for a short time on a circuit maintained by LS-7 allowing the lifting dog 81 to move away from stop position so that LS-4 closes before LS-7 is opened by departure of the carriage 72 from the pickup zone.

Ordinarily the return conveyor mechanism 36 continues operating, carrying the carriage 72 up and over the apparatus, depositing it in the loading zone 20 and continuing until the lifting dogs 81 return to the position illustrated in FIG. 14 whereupon the lifting dog 81 once again opens LS-4 breaking the circuit through contact 226 to the relay 216 dropping it out so that the contacts 221 open to stop the return conveyor 36.

However, if a carriage 72 in the loading zone 20 upon which the operator is placing a new sheet of glass to be treated has not been moved out of the loading zone into the furnace by the time the return conveyor 36 transports a carriage 72 from the pickup zone to the front part of the overhead framework where LS-6 is located (FIG. 1), LS-5 is open because the carriage 72 is in the loading zone 20 and LS-6 is opened when a carriage 72 reaches its position. With both LS-5 open (carriage present in loading zone) and LS-6 open (carriage enroute to loading zone) the circuit through contacts 226 is opened when the carriage reaches LS-6 so that the return conveyor is stopped at this point before it can move a carriage into the loading zone 20 and into disastrous engagement with the carriage waiting in the loading zone 20 to be moved into the furnace. Under these conditions, therefore, a carriage 72 may be waiting in the loading zone 20 ready to be moved into the furnace and a following carriage may be suspended in the overhead framework 123 at the position of LS-6 waiting to be moved downwardly into the loading zone 20. Of course, as soon as the carriage then present in the loading zone 20 is actually moved away from the loading zone 20, LS-5 closes re-energizing the relay 216 and the return conveyor power circuit so that the carriage then waiting at the position of LS-6 is moved on down into the loading zone 20.

Under these normal operating conditions entry of a carriage into Zone One of the furnace is under the complete and exclusive control of timer 207. When the period of treatment in Zone One terminates, the timer 207 closes its contacts so current flows from the side of the line 230 along a connecting line 233 through the contacts of the timer 207 and through a connecting line 234 to the coil of relay 214 and thence to the other side of the line 232. Energization of relay 214 closes the three contacts 219 energizing the first driving mechanism 26 to commence its movement and to open the entrance doors 47 and 48. Immediately thereafter LS-2 closes. Since contacts 224 have been closed by energization of the relay 214, a hold-in circuit for the relay 214 is established through the contacts of the timer 207. Energization of the relay 214 also opens normally closed contacts 227 and closes normally open contacts 228. The opening of contacts 227 breaks the circuit through the contact of relay 229 of the photocell apparatus 204 and thus prevents the starting of the second driving mechanism 33 by the glass sag photocell control while the first driving mechanism 26 is running.

Under these normal operating conditions, a carriage 72 would not be present in Zone Two of the furnace every time that a carriage 72 is to be moved into Zone One of the furnace and, simultaneously therewith, a carriage under treatment in Zone One of the furnace must be moved into Zone Two of the furnace. The presence of a carriage in Zone Two of the furnace when a subsequent carriage is to be moved in Zone Two requires that the carriage then present in Zone Two of the furnace be moved out of the furnace in order to permit the carriage then in Zone One to be moved into Zone Two. This determination is under the control of photocell apparatus 210 which senses the presence of a carriage in Zone Two of the furnace. Thus its relay 213 is closed and when contact 228 of relay 214 closes at the beginning of the operation of the first driving mechanism 26, current flows through the contact of the timer 207, the contact of relay 213 and contacts 228 to the connecting line 231 to energize the second driving mechanism. Thus under normal operating conditions whenever the timer 207 reaches the end of a heating period for Zone One of the furnace and initiates the movement of the glass under treatment therein out of Zone One of the furnace and into Zone Two of the furnace, the presence of a carriage in Zone Two of the furnace results in the second driving mechanism 33 also being energized to move that carriage out of Zone Two of the furnace. By this interconnection the maximum dwell of a carriage in either Zone One or Zone Two is the period of time determined by the timer 207 and, regardless of whether or not the glass in Zone Two has sagged sufficiently to initiate its own removal from Zone Two, it is removed therefrom when a subsequent sheet of glass is to be moved thereinto.

From this interrelation it also follows that at the beginning of operation of the furnace of the apparatus when the first system is employed, the third conveyor 34 is not energized and the exit doors 51 and 52 are not opened when the first sheet of glass is moved from the loading zone into Zone One or when the first sheet of glass is moved from Zone One into Zone Two. Because no sheet of glass is present in Zone Two during these first two cycles of operation it is not necessary that the exit doors 51 and 52 be opened so they remain closed conserving substantial quantities of heat.

*Second operating system.*—In the second operating system the entire furnace and its associated first and second driving mechanisms 26 and 33 are under the exclusive control of the timer 207. The photocell apparatuses 204 and 210 are taken out of the circuit by opening selector switch 209. As mentioned earlier, this results in the contact of the relay 213 closing so that the connection from the contact of the timer 207 to contacts 228 of the relay 214 is permanently established. As a result, whenever the contacts of the timer 207 are closed at the end of a timed period and the relay 214 is energized to start the first driving mechanism 26, current always flows to the coil of the relay 215 to simultaneously start the second driving mechanism 33. The function of the photocell apparatus 204 to signal that a piece of glass in Zone Two has sagged to a desired degree is eliminated. Similarly the function of photocell apparatus 210 to signal that a carriage is present in Zone Two of the furnace is unnecessary.

*Control of heat gradation*

In an apparatus embodying the invention it is possible not only to accomplish the automatic treatment of glass sheets in the manner previously discussed but the apparatus and its control system make possible an improved method for treating glass sheets comprising the application thereto of gradations of heat both transversely and longitudinally of the furnace in order to properly condition sheets of glass having complex curvatures for their bending around radii of substantially different lengths and their bending along mold surfaces of varying degrees of curvature. A furnace apparatus embodying the invention may provide for this improved method of operation because each sheet of glass being treated is moved in a step-by-step progression through the apparatus and is stationary during each period of heat treatment in both Zones One and Two of the furnace. In apparatus for treating glass sheets wherein the sheets are constantly in motion successful establishment of heat gradations in directions along the line of motion cannot be obtained because each increment of the glass sheet extending in the direction of movement of the sheet passes successively adjacent the same heat sources.

In contrast to this problem which exists in automatic glass treating furnaces in which the sheet of glass constantly moves, apparatus embodying the present invention moves the glass sheets only during the relatively short period of time when they are transferred from the loading zone 20 into Zone One of the furnace, from Zone One to Zone Two, etc. Each glass sheet remains in stationary position in Zone One of the furnace for a full heating period under the control of the timer 207 regardless of whether the first or second system is employed. The invention, therefore, includes not only apparatus making heat gradations in both directions possible but also a method of operating such apparatus in order to apply heat to a glass sheet being treated with gradations of heat application extending both transversely and longitudinally of the furnace.

As mentioned earlier, a furnace 21 embodying the invention has a plurality of burners 46 illustrated in FIG. 1 as being mounted in the side walls of the furnace 21 and only generally referred to earlier in this specification. A furnace apparatus embodying the invention intended to be operated according to the method aspect now under discussion also comprises a plurality of roof burners 235 generally indicated by their center lines only in FIG. 17 wherein the side wall burners 46 are also similarly indicated. The roof burners 235 in Zone One of the furnace extend transversely across the roof of the furnace, for example, in six parallel rows of, say, ten burners each.

In FIG. 19 the rows of burners are indicated by the letters A–F, inclusive, and the ten files of burners are indicated by the numerals I–X, respectively.

The section depicted in FIG. 17 is taken along the line of row D and the section depicted in FIG. 18 is taken along the line of file III (section line 18—18). FIG. 19 also shows the relative positioning of two sets of wall burners 46 as aligned with the roof burners 235 in rows A–F inclusive.

The arrangement shown in FIGS. 17–19 illustrates the carrying out of the temperature gradation method aspects of the invention for the proper heating of a sheet of glass having a complex curvature in both directions such as, for example, a back-light for a closed automobile. Such a sheet of glass is shown in FIGS. 17 and 18 in dotted lines indicated by the reference number 236. The glass is indicated in its final curved form in FIGS. 17 and 18 even though, of course, the burner set-up and method of operation are designed to apply heat in gradations to the glass before it is bent into final form.

Attention is particularly drawn to rows B, D and E of the burners 46 and 235 and files III and VIII of the roof burners 235 in considering the temperature gradation method of operating apparatus embodying the invention. It will be noted by comparing FIGS. 17–19 with each other that beneath files III and VIII of the roof burners 235 the sheet of glass 236 is rather sharply bent as compared to its bending either inwardly or outwardly therefrom. Reference to files III and VIII of the chart, FIG. 19, shows that each of these files, reading progressively through rows A–F, has its six burners connected to combustible mixtures under pressure indicated by the letter "X" or normal pressure, and "H" for high pressure. Reading down files III and VIII the six burners are connected as follows: A—normal pressure, B—high pressure, C—off, D—normal pressure, E—high pressure, F—normal pressure. The presence in files III and VIII of the two burners of rows B and E connected to a source of combustible mixture under "high" pressure results in there being applied to the four areas in the sheet of glass 236 immediately beneath burners B–III, E–III, B–VIII and E–VIII, heat at a higher intensity than the heat applied to other areas of the glass sheet 236. The actual application of the intense heat to the areas thus designated from the burners connected to a source of combustible mixture is substantially assisted by the presence of roof deflectors 237 which function to direct the extra hot combustion products delivered from the burners connected to high pressure onto the upper surfaces of portions of the glass extending beneath files III and VIII.

Considering the configuration of the glass sheet 236 as indicated in FIG. 18 it will be observed that immediately beneath the general locations of the burners B–III and E–III, the glass sheet 236 has areas of sharp curvature. Therefore, again, the high pressure connected burners B–III and E–III apply their intense heat to those particular areas of the glass wherein a sharper curvature must take place.

It will also be observed by reference to FIG. 17 and to the side columns in FIG. 19 that the method of the invention includes the utilization of floor deflectors 238. The floor deflectors are in line to guide the flow of combustion gases and thus convection heat from the two rows of wall burners 46. The two rows of wall burners 46 in the arrangement of FIGS. 17–19 are connected to the sources of combustible mixture so that the burners in rows A and B are connected to normal pressure, C is not lit, D is connected to ultra high pressure and E and F are connected to normal pressure. As a result high heat is delivered from the burners 46 in rows A, B, E and F to the edges of the glass sheet 236 (FIG. 19—left and right edges) and ultra high heat is delivered by the burners D to a part of the glass wherein the sharpest curvature must take place. Both sets of wall burners 46 are similarly connected to the sources of combustible gases under the varying pressure to reproduce the pattern of heat at both ends of the glass sheet 236, the gradations extending also across the sheet 236 from one long edge to the other long edge.

The roof deflectors 237 and floor deflectors 238 are movable and any of the burners in either the wall series 46 or roof series 235 may be connected to the combustible mixture at any of the desired pressures. While only three pressures, viz., "normal," "high" and "ultra high" are referred to in the chart, FIG. 19, and in the above discussion, it is to be understood that these are merely illustrative of the range of gas pressures and resulting intensities of heat from the various burners and many variations in pressure as, for example, from as low as only a few inches to as many as, say, 80 inches of water, may be employed to give varying intensities of heat to the burners in a pattern correlated to the final curvature of the glass sheet 236 so that those parts of the sheet where sharpest bends are to take place will be heated to the higher or highest levels. Furthermore, while the discussion of FIGS. 17–19 has been generally directed to an arrangement in which the glass sheet has complementary curved areas on both sides of its center lines, the combination of variability of burner connections and movability of the deflectors provides for arranging these elements in any desired pattern to properly apply heat gradations across the surfaces of pieces of glass of any shape, whether balanced or unbalanced.

An unbalanced sheet of glass 239 is indicated by a dotted line in FIGS. 20 and 21 with the chart 22 illustrating how the various burners 46 and 235 would be connected to the sources of combustible mixture under various pressures and associated with the movable roof deflectors 237 for concentrating heat in the areas of the glass sheet 239 to be most sharply bent and in establishing the temperature gradations across the glass 239 in both directions. The sheet of glass 239 might be, for example, a corner window for a motor vehicle or a house trailer, a half windshield for a motorboat, or any other piece of glass having a complex unbalanced curvature.

The two glass sheets 236 and 239 illustrated in FIGS. 17–18 and 20–21, respectively, are chosen merely as illustrative of varying shapes of glass across the surfaces of which temperature and heat gradations may be established and maintained according to this method of operation of apparatus embodying the invention.

It should be noted that while six rows of burners are shown in the drawings, the glass sheets in FIGS. 18 and 21 only extend beneath four of the rows. The two outermost rows, A and F, all the burners of which are connected to "X" pressure, are utilized for heating the structure of the mold sections 75 and 76 and the carriages 72 to temperature so that they do not interfere with the glass heating process by "robbing" heat from the glass.

Similarly, the roof deflectors 237 and floor deflectors 238 are illustrated as being only as wide as the sheets of glass and as extending continuously. This size and configuration is also only illustrative. In some cases, the deflectors 237 and 238 are of less width than the glass or each consists of two separate spaced pieces. The decisive factor, of course, is the direction of heat to those areas of the particular pieces of glass where the sharper bends are to take place.

The gradient heating in both directions across the glass sheets is made possible according to the invention in either the pre-heat zone ("Zone One") of the furnace illustrated or in the finishing zone ("Zone Two") although it is particularly useful in the pre-heat zone.

While the illustrated furnace is shown as having only a single compartment in its pre-heat zone, furnaces according to the invention and operable thereunder may have any number of compartments in their pre-heat zones, say 2 or 3 or more, with, say, increasing temperatures. In each of these compartments suitable connections to the different pressures may be made for each of the stationary burners, both roof and wall, and suitable deflectors, both roof and floor, may be employed to establish heat gradients across the glass sheets in both directions. Where a furnace has 2 or more pre-heat compartments the first conveyor would extend through the several compartments of "Zone One" in the same way as in the illustrated furnace but, of course, would move each glass sheet in steps from the loading zone into the first compartment of "Zone One" then into the second compartment of "Zone One," etc., then from the last compartment of "Zone One" into "Zone Two," etc. The designation "Zone One" refers, therefore, to the function of the zone rather than to how many compartments or areas of different temperature it may comprise.

Having described the invention, we claim:

1. Apparatus for bending glass sheets to conformity with sag molds, said apparatus comprising, in combination, a furnace having two neighboring heating zones, an entrance into the first of said zones and an exit from the second of said zones, means for heating the first of said zones to a controlled pre-heat temperature, means for heating the second of said zones to a controlled bending temperature, a first mold conveyor extending through said entrance into and through the length of said first zone, a first cyclic drive mechanism operatively connected to drive said first conveyor, a second mold conveyor extending in alignment with said first conveyor and through the length of said second zone, a first clutch adapted to couple said first and second conveyors, a timer connected to said first cyclic drive mechanism for actuating said first cyclic drive mechanism and for closing said first clutch upon the expiration of a fixed pre-heat time period for moving a mold from said first zone to said second zone and a succeeding mold from outside said furnace through said entrance and into said first zone, a third mold conveyor extending in alignment with the end of said second conveyor and away from said exit, a second clutch adapted to couple said second and third conveyors, means responsive to the presence of a preceding mold in said second zone for closing said second clutch for moving said preceding mold out of said second zone and said exit when said second conveyor is coupled by said first clutch to said first conveyor, a second cyclic drive mechanism operatively connected to drive said third conveyor, means responsive to the sag of a sheet of glass into conformity with its mold in said second zone for actuating said second drive mechanism and closing said second clutch for moving such mold out of said second zone and said exit independently of the operation of said timer.

2. Apparatus according to claim 1 in which each of said first and second drive mechanisms comprises a rotating element and transfer means operatively connecting said rotating element to the respective one of said first and third conveyors for sinusoidal movement of said conveyors and the molds being moved thereby.

3. Apparatus according to claim 1 and a door across the entrance to said first zone and door operating mechanism connected to and driven by said first cyclic drive mechanism for opening said door at the beginning of a cycle thereof and closing said door at the end of a cycle thereof.

4. Apparatus according to claim 1 and a door across the exit from said second zone and door operating mechanism operatively connected to and actuated by said third conveyor for opening said door at the beginning of a cycle before movement of said third conveyor and closing said door after movement of said third conveyor.

5. Apparatus according to claim 1 and (1) a mold return conveyor, said mold return conveyor having (a) a portion aligned with the end of said third conveyor beyond the exit side of said furnace, (b) a main section extending around said furnace to the entrance side thereof and, (c) a portion adjacent the front end of said first conveyor, (2) means for transferring a mold from said third conveyor to said return conveyor, (3) means for transferring a mold from said return conveyor to said first conveyor and (4) power mechanism for driving said return conveyor.

References Cited by the Examiner

UNITED STATES PATENTS

| | | | |
|---|---|---|---|
| 2,348,887 | 5/1944 | Drake | 65—287 X |
| 2,646,647 | 7/1953 | Bamford et al. | 65—103 |
| 2,671,987 | 3/1954 | Jendrisak | 65—273 |
| 2,766,555 | 10/1956 | Jendrisak et al. | 65—103 |
| 2,794,300 | 6/1957 | Golightly | 65—158 |
| 2,917,871 | 12/1959 | Atkeson | 65—161 |

FOREIGN PATENTS 292,448  6/1928  Great Britain.

DONALL H. SYLVESTER, *Primary Examiner.*

F. W. MIGA, *Assistant Examiner.*